United States Patent
Emi

(10) Patent No.: US 9,939,610 B2
(45) Date of Patent: Apr. 10, 2018

(54) SINGLE FOCAL LENGTH LENS SYSTEM, CAMERA, AND AUTOMOBILE

(71) Applicant: Panasonic Intellectual Property Management Co., Ltd., Osaka (JP)

(72) Inventor: Kenichi Emi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 112 days.

(21) Appl. No.: 15/209,312

(22) Filed: Jul. 13, 2016

(65) Prior Publication Data

US 2016/0320613 A1 Nov. 3, 2016

Related U.S. Application Data

(63) Continuation of application No. PCT/JP2014/005465, filed on Oct. 29, 2014.

(30) Foreign Application Priority Data

Jan. 20, 2014 (JP) .................................. 2014-007495

(51) Int. Cl.
*G02B 9/04* (2006.01)
*G02B 13/00* (2006.01)
(Continued)

(52) U.S. Cl.
CPC .................. *G02B 9/04* (2013.01); *G02B 9/12* (2013.01); *G02B 9/34* (2013.01); *G02B 13/002* (2013.01);
(Continued)

(58) Field of Classification Search
CPC ... G02B 9/04; G02B 9/16; G02B 9/10; G02B 13/003
(Continued)

(56) References Cited

U.S. PATENT DOCUMENTS 5,321,554 A * 6/1994 Ishiyama ............. G02B 15/177
359/684
5,671,062 A 9/1997 Nakamura
(Continued)

FOREIGN PATENT DOCUMENTS

JP 4-343313 11/1992
JP 2006-284620 10/2006
(Continued)

OTHER PUBLICATIONS

International Search Report issued Feb. 3, 2015 in International (PCT) Application No. PCT/JP2014/005465.

*Primary Examiner* — Darryl J Collins
(74) *Attorney, Agent, or Firm* — Wenderoth, Lind & Ponack, L.L.P.

(57) ABSTRACT

A single focal length lens system, in order from an object side to an image side, includes a first lens unit having optical power, an aperture diaphragm, and a second lens unit having positive optical power is provided. The first lens unit, in order from the object side to the image side, includes a first sub-lens unit having negative optical power, and a second sub-lens unit having positive optical power. The single focal length lens system satisfies the following condition: $|dn/dt|_{MAX} \leq 2.67 \times 10^{-5}$ ($|dn/dt|_{MAX}$: a maximum value of absolute values of relative refractive index temperature coefficients in the atmosphere at 0 to 20° C. with respect to light having a wavelength range of 580 to 640 nm, which is calculated for each lens element constituting the second sub-lens unit).

7 Claims, 16 Drawing Sheets

(51) Int. Cl.
  *G02B 9/12* (2006.01)
  *G02B 9/34* (2006.01)
  *G02B 13/18* (2006.01)
  *G02B 27/00* (2006.01)
  *H04N 5/225* (2006.01)
  *G02B 13/06* (2006.01)

(52) U.S. Cl.
  CPC ....... *G02B 13/006* (2013.01); *G02B 13/0045* (2013.01); *G02B 13/06* (2013.01); *G02B 13/18* (2013.01); *G02B 27/0025* (2013.01); *H04N 5/2254* (2013.01)

(58) Field of Classification Search
  USPC ................ 359/646, 661, 717, 748, 753, 793
  See application file for complete search history.

(56) References Cited

U.S. PATENT DOCUMENTS

| | | | | |
|---|---|---|---|---|
| 7,903,348 | B2 * | 3/2011 | Sensui | .................. G03B 17/02 359/793 |
| 2002/0167738 | A1 * | 11/2002 | Mori | ........................ G02B 9/34 359/771 |
| 2006/0274433 | A1 | 12/2006 | Kamo | |
| 2007/0201140 | A1 * | 8/2007 | Kato | ........................ G02B 9/04 359/680 |
| 2007/0206295 | A1 | 9/2007 | Yamashita et al. | |
| 2008/0080061 | A1 * | 4/2008 | Miyano | ................ G02B 23/243 359/661 |
| 2010/0188757 | A1 | 7/2010 | Saitoh | |
| 2011/0317285 | A1 * | 12/2011 | Ohashi | ..................... G02B 9/64 359/753 |
| 2014/0347494 | A1 | 11/2014 | Yamazaki et al. | |
| 2016/0187617 | A1 | 6/2016 | Komiyama | |

FOREIGN PATENT DOCUMENTS

| | | |
|---|---|---|
| JP | 2006-337691 | 12/2006 |
| JP | 2007-233152 | 9/2007 |
| JP | 2008-026748 | 2/2008 |
| JP | 2009-63877 | 3/2009 |
| JP | 2012-018422 | 1/2012 |
| JP | 2013-205715 | 10/2013 |
| JP | 2015-34922 | 2/2015 |

* cited by examiner

SINGLE FOCAL LENGTH LENS SYSTEM, CAMERA, AND AUTOMOBILE

CROSS-REFERENCE TO RELATED APPLICATION

This application is a Continuation of International Application No. PCT/JP2014/005465, filed on Oct. 29, 2014, which in turn claims the benefit of Japanese Application No. 2014-007495 filed on Jan. 20, 2014, the disclosures of which Applications are incorporated by reference herein.

BACKGROUND

Field

The present disclosure relates to single focal length lens systems, cameras, and automobiles.

Description of the Related Art

Japanese Laid-Open Patent Publication No. 2012-018422 discloses a lens system including a front unit composed of two lenses and a rear unit composed of four lenses and an aperture diaphragm, in which a focal shift resulting from a temperature change is reduced.

SUMMARY

The present disclosure provides a single focal length lens system which has a sufficiently wide angle of view, a small size, and excellent temperature characteristics. In addition, the present disclosure provides a camera including the single focal length lens system, and an automobile including the camera.

A single focal length lens system according to the present disclosure, in order from an object side to an image side, includes a first lens unit having optical power, an aperture diaphragm, and a second lens unit having positive optical power, wherein the first lens unit, in order from the object side to the image side, includes a first sub-lens unit having negative optical power, and a second sub-lens unit having positive optical power, the first sub-lens unit includes at least one lens element, a lens element included in the first sub-lens unit and having a greatest negative optical power is a lens element made of resin, and has a concave surface facing the image side, the second lens unit is composed of a cemented lens element, the cemented lens element is obtained by cementing two lens elements made of resin, and includes a lens element having negative optical power and a lens element having positive optical power, and has a joint surface which is an aspheric surface, and the following conditions (1-1), (3) and (4) are satisfied:

$$|dn/dt|_{MAX} \leq 2.67 \times 10^{-5} \quad (1\text{-}1)$$

$$1.5 \leq f_{G2}/f \leq 3.5 \quad (3)$$

$$-3.5 \leq f_{LN}/f \leq -0.5 \quad (4)$$

where $|dn/dt|_{MAX}$ is a maximum value of absolute values of relative refractive index temperature coefficients in an atmosphere at 0 to 20° C. with respect to light having a wavelength range of 580 to 640 nm, which is calculated for each lens element constituting the second sub-lens unit, $f_{G2}$ is a focal length at d-line of the second lens unit, f is the focal length at d-line of the entire system, and $f_{LN}$ is a focal length at d-line of the lens element included in the first sub-lens unit and having the greatest negative optical power.

A camera according to the present disclosure includes:
the above-described single focal length lens system; and
an imaging device which captures an image of light converged by the single focal length lens system.

An automobile according to the present disclosure includes:
a camera; and
a processing unit which detects external environment on the basis of the image captured by the imaging device included in the camera, and controls each part, wherein
the camera includes:
the above-described single focal length lens system; and
an imaging device which captures an image of light converged by the single focal length lens system.

Another single focal length lens system according to the present disclosure includes an aperture diaphragm, a first lens unit disposed on an object side relative to the aperture diaphragm, and a second lens unit disposed on an image side relative to the aperture diaphragm, wherein the first lens unit includes a first lens element which is made of resin and has negative optical power, and a second lens element which is disposed on the image side relative to the first lens element, is made of glass, and has positive optical power, the second lens unit includes a cemented lens element which is obtained by cementing at least two lens elements made of resin, and has positive optical power, and the second lens element satisfies the following condition (1-2):

$$|dn/dt|_{L2} \leq 2.67 \times 10^{-5} \quad (1\text{-}2)$$

where $|dn/dt|_{L2}$ is an absolute value of a relative refractive index temperature coefficient in an atmosphere at 0 to 20° C. with respect to light having a wavelength range of 580 to 640 nm, which is calculated for the second lens element.

The single focal length lens system according to the present disclosure has a diagonal angle of view widened to about 90° or more, is small in size, causes less change in optical characteristics even with a temperature change in a range of about 20 to 80° C., for example, and also has excellent temperature characteristics.

DETAILED DESCRIPTION

Hereinafter, embodiments will be described in detail with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the inventors provide the attached drawings and the following description so that those skilled in the art can fully understand this disclosure. Therefore, the drawings and description are not intended to limit the subject defined by the claims.

In the present disclosure, a lens unit is a unit composed of at least one lens element, and the power, the composite focal length, and the like of each lens unit are determined in accordance with the type, the number, the arrangement, and the like of the lens elements constituting the lens unit.

Embodiments 1 to 7: Single Focal Length Lens System

FIGS. 1, 3, 5, 7, 9, 11 and 13 are lens arrangement diagrams of single focal length lens systems according to Embodiments 1 to 7, respectively, and each diagram shows the single focal length lens system in an infinity in-focus condition. In each Fig., an asterisk "*" imparted to a particular surface indicates that the surface is aspheric. In each Fig., a straight line located on the most right-hand side indicates the position of an image surface S.

Embodiment 1

Figure 1:
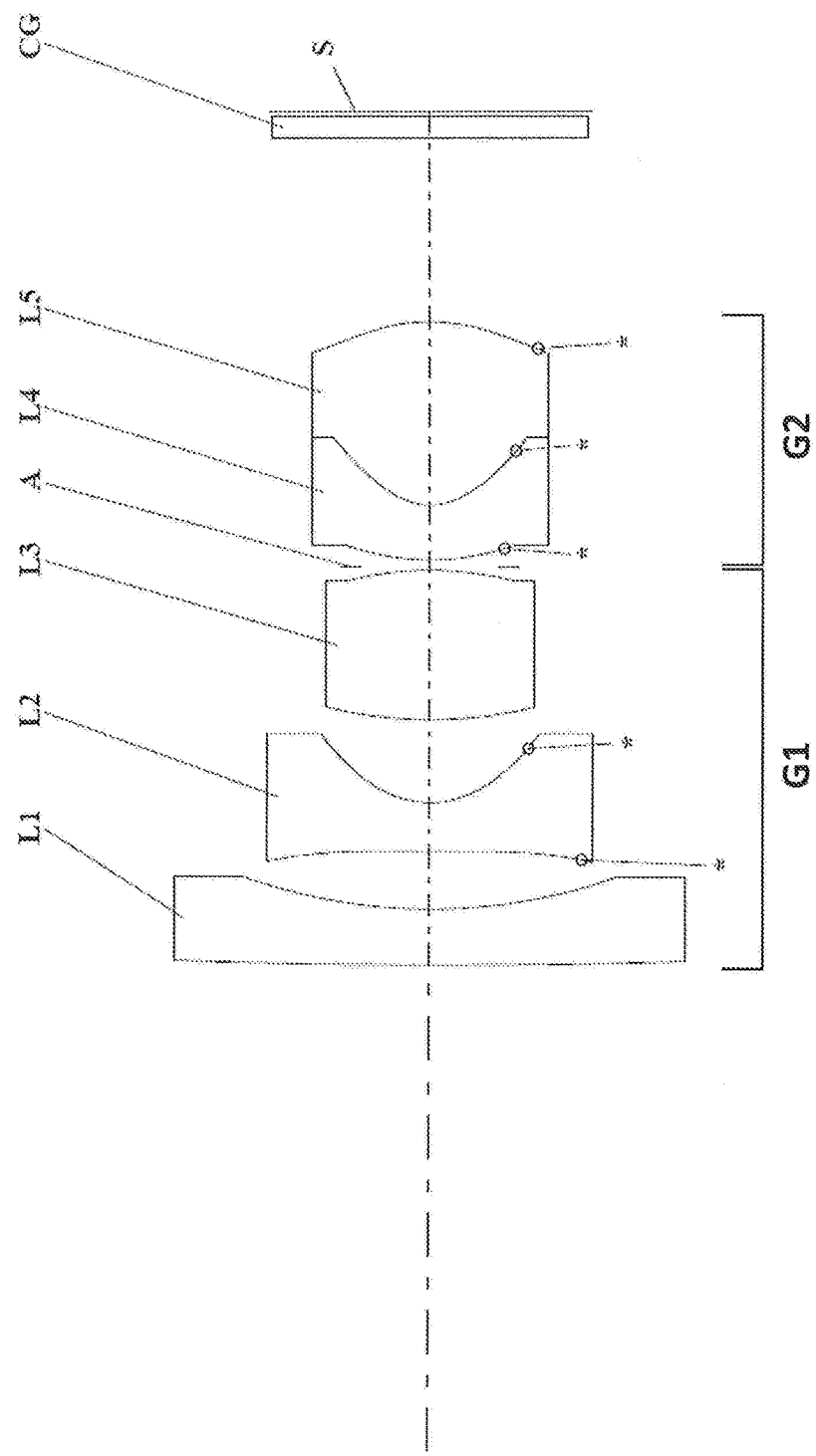
FIG. 1 is a lens arrangement diagram showing an infinity in-focus condition of a single focal length lens system according to Embodiment 1 (Numerical Example 1)
Figure 2:
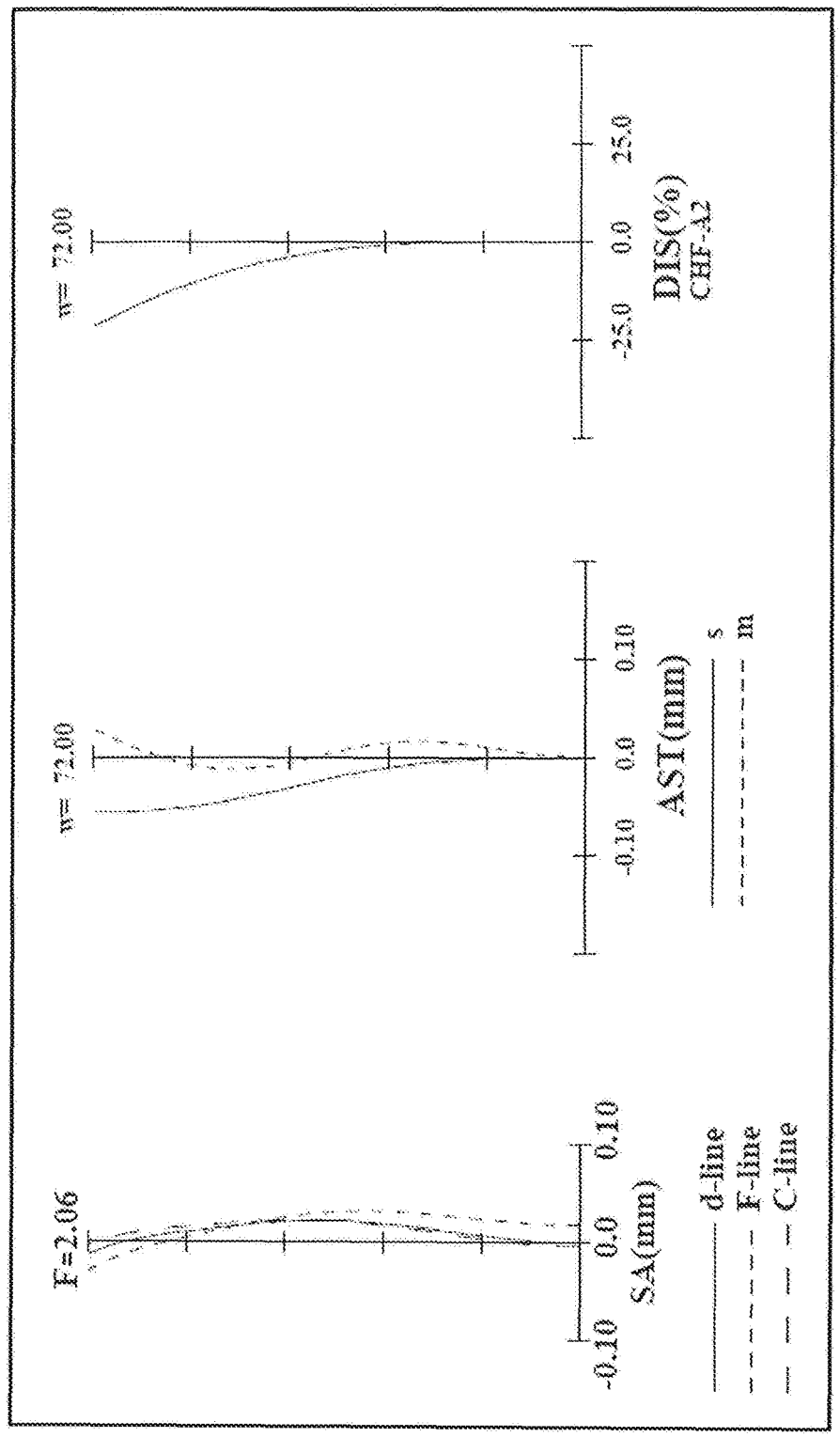
FIG. 2 is a longitudinal aberration diagram of the infinity in-focus condition of the single focal length lens system according to Numerical Example 1.

As shown in FIG. 1, the single focal length lens system according to Embodiment 1, in order from the object side to the image side, includes a first lens unit G1 having negative optical power, an aperture diaphragm A, and a second lens unit G2 having positive optical power.

The first lens unit G1, in order from the object side to the image side, includes a first lens element L1, a second lens element L2, and a third lens element L3. The second lens unit G2, in order from the object side to the image side, includes a fourth lens element L4 and a fifth lens element L5. The fourth lens element L4 and the fifth lens element L5 constitute a cemented lens element having an aspheric joint surface, and this cemented lens element has positive optical power.

In the first lens unit G1, the first lens element L1 and the second lens element L2 constitute a first sub-lens unit having negative optical power, and the third lens element L3 constitutes a second sub-lens unit having positive optical power.

The first lens element L1 is a lens element which has negative optical power and is made of glass. The first lens element L1 is a meniscus lens element with the convex surface facing the object side.

The second lens element L2 is a lens element which has negative optical power and is made of resin. The second lens element L2 is a meniscus lens element with the convex surface facing the object side. The second lens element L2 has two aspheric surfaces.

The third lens element L3 is a lens element which has positive optical power and is made of glass. The third lens element L3 is a bi-convex lens element.

The fourth lens element L4 is a lens element which has negative optical power and is made of resin. The fourth lens element L4 is a meniscus lens element with the convex surface facing the object side. The fourth lens element L4 has two aspheric surfaces.

The fifth lens element L5 is a lens element which has positive optical power and is made of resin. The fifth lens element L5 is a bi-convex lens element. The fifth lens element L5 has two aspheric surfaces.

In the single focal length lens system according to Embodiment 1, a parallel plate CG is disposed on the object side relative to the image surface S (between the image surface S and the fifth lens element L5).

Embodiment 2

Figure 3:
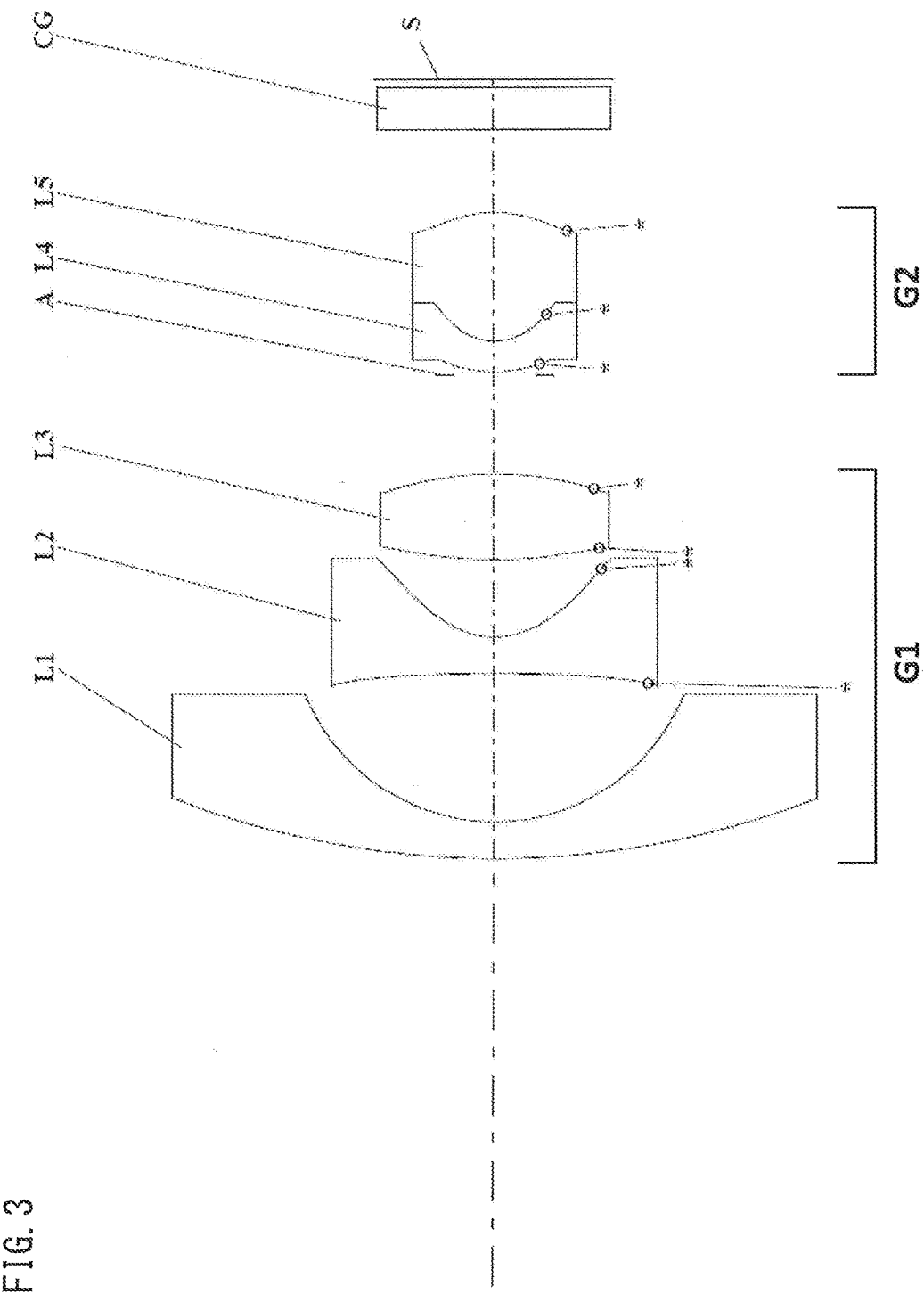
FIG. 3 is a lens arrangement diagram showing an infinity in-focus condition of a single focal length lens system according to Embodiment 2 (Numerical Example 2)
Figure 4:
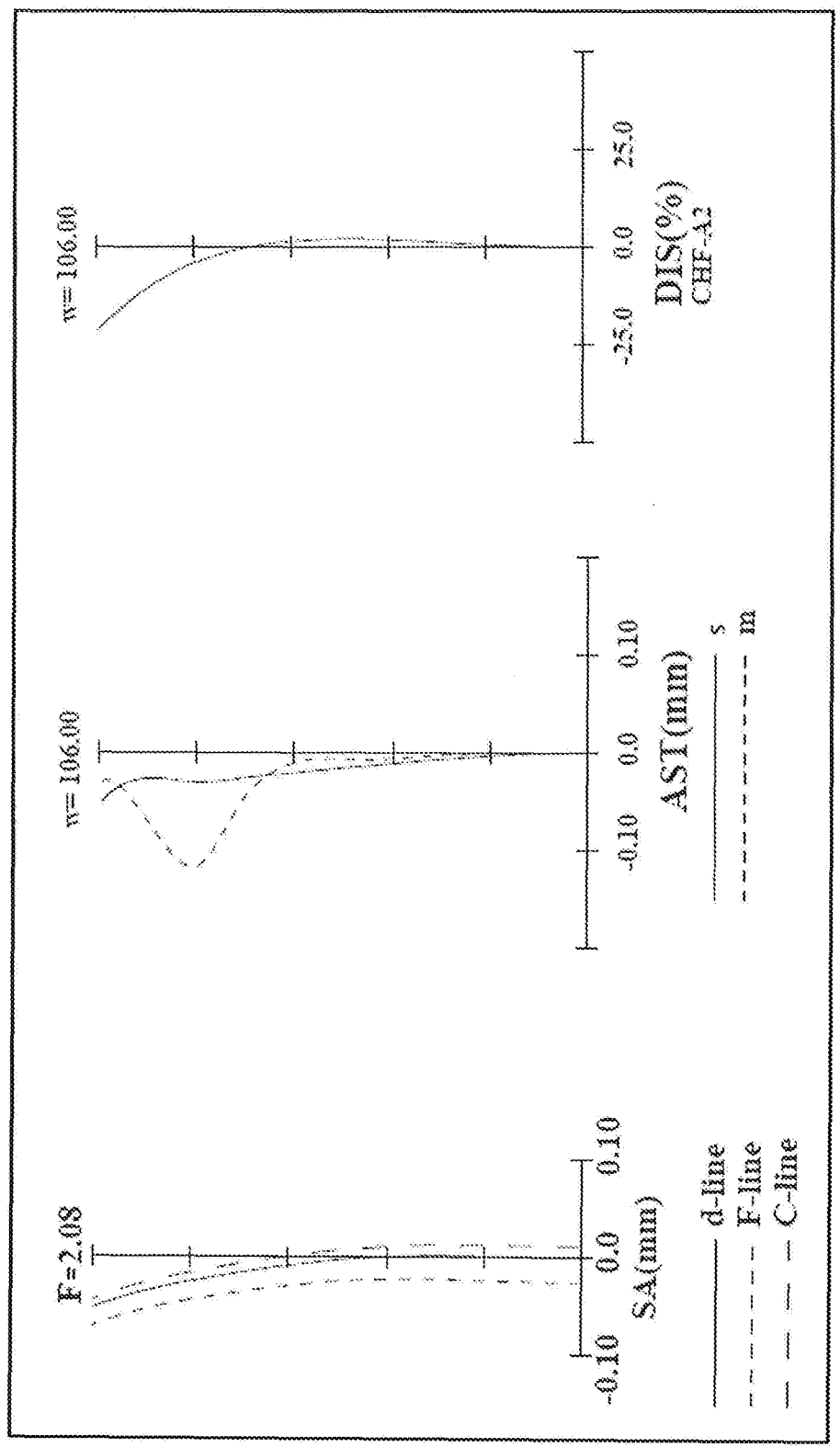
FIG. 4 is a longitudinal aberration diagram of the infinity in-focus condition of the single focal length lens system according to Numerical Example 2.

As shown in FIG. 3, the single focal length lens system according to Embodiment 2, in order from the object side to the image side, includes a first lens unit G1 having negative optical power, an aperture diaphragm A, and a second lens unit G2 having positive optical power.

The first lens unit G1, in order from the object side to the image side, includes a first lens element L1, a second lens element L2, and a third lens element L3. The second lens unit G2, in order from the object side to the image side, includes a fourth lens element L4 and a fifth lens element L5. The fourth lens element L4 and the fifth lens element L5 constitute a cemented lens element having an aspheric joint surface, and this cemented lens element has positive optical power.

In the first lens unit G1, the first lens element L1 and the second lens element L2 constitute a first sub-lens unit having negative optical power, and the third lens element L3 constitutes a second sub-lens unit having positive optical power.

The first lens element L1 is a lens element which has negative optical power and is made of glass. The first lens element L1 is a meniscus lens element with the convex surface facing the object side.

The second lens element L2 is a lens element which has negative optical power and is made of resin. The second lens element L2 is a bi-concave lens element. The second lens element L2 has two aspheric surfaces.

The third lens element L3 is a lens element which has positive optical power and is made of glass. The third lens element L3 is a bi-convex lens element. The third lens element L3 has two aspheric surfaces.

The fourth lens element L4 is a lens element which has negative optical power and is made of resin. The fourth lens element L4 is a meniscus lens element with the convex surface facing the object side. The fourth lens element L4 has two aspheric surfaces.

The fifth lens element L5 is a lens element which has positive optical power and is made of resin. The fifth lens element L5 is a bi-convex lens element. The fifth lens element L5 has two aspheric surfaces.

In the single focal length lens system according to Embodiment 2, a parallel plate CG is disposed on the object side relative to the image surface S (between the image surface S and the fifth lens element L5).

Embodiment 3

Figure 5:
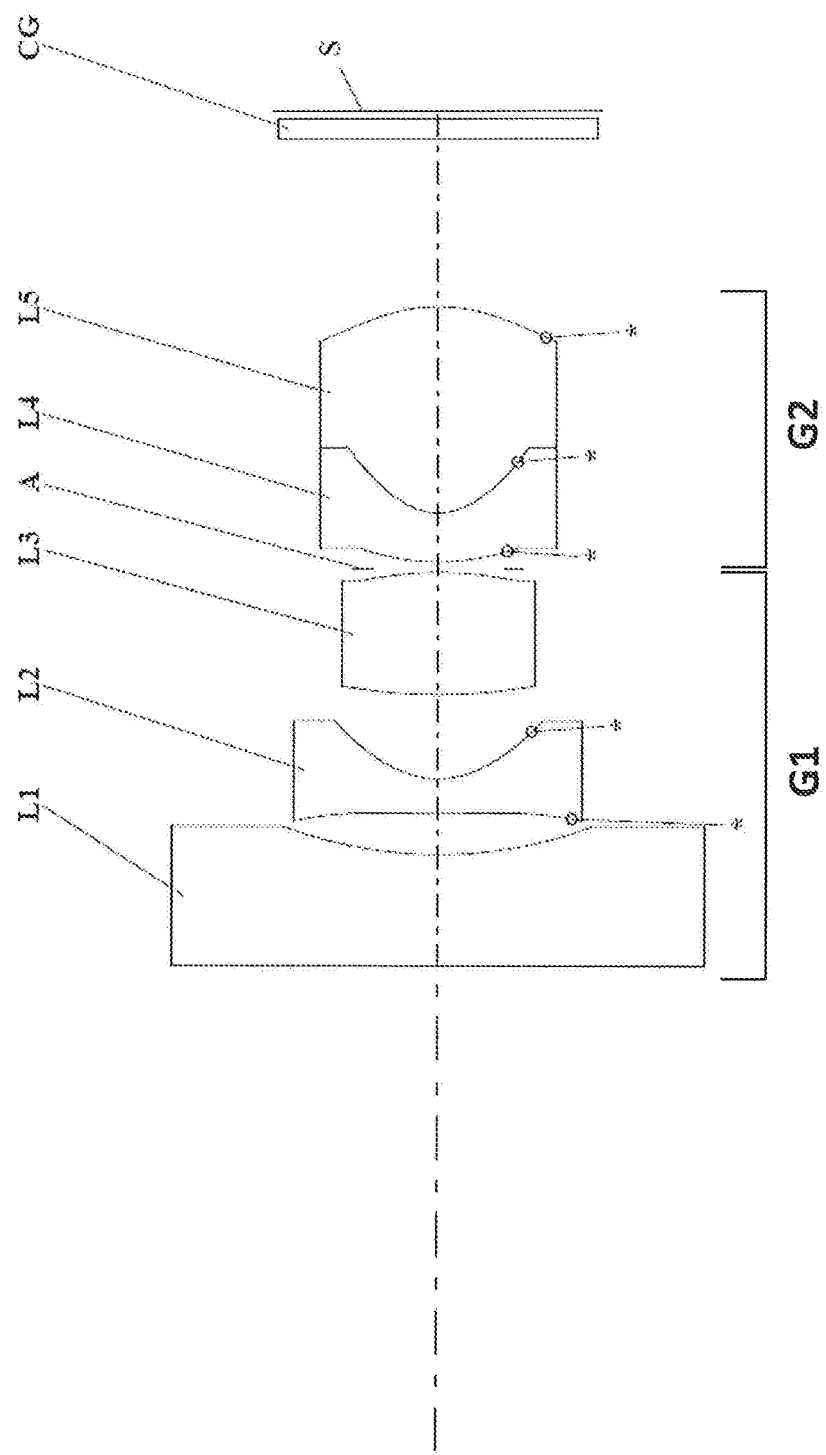
FIG. 5 is a lens arrangement diagram showing an infinity in-focus condition of a single focal length lens system according to Embodiment 3 (Numerical Example 3)
Figure 6:
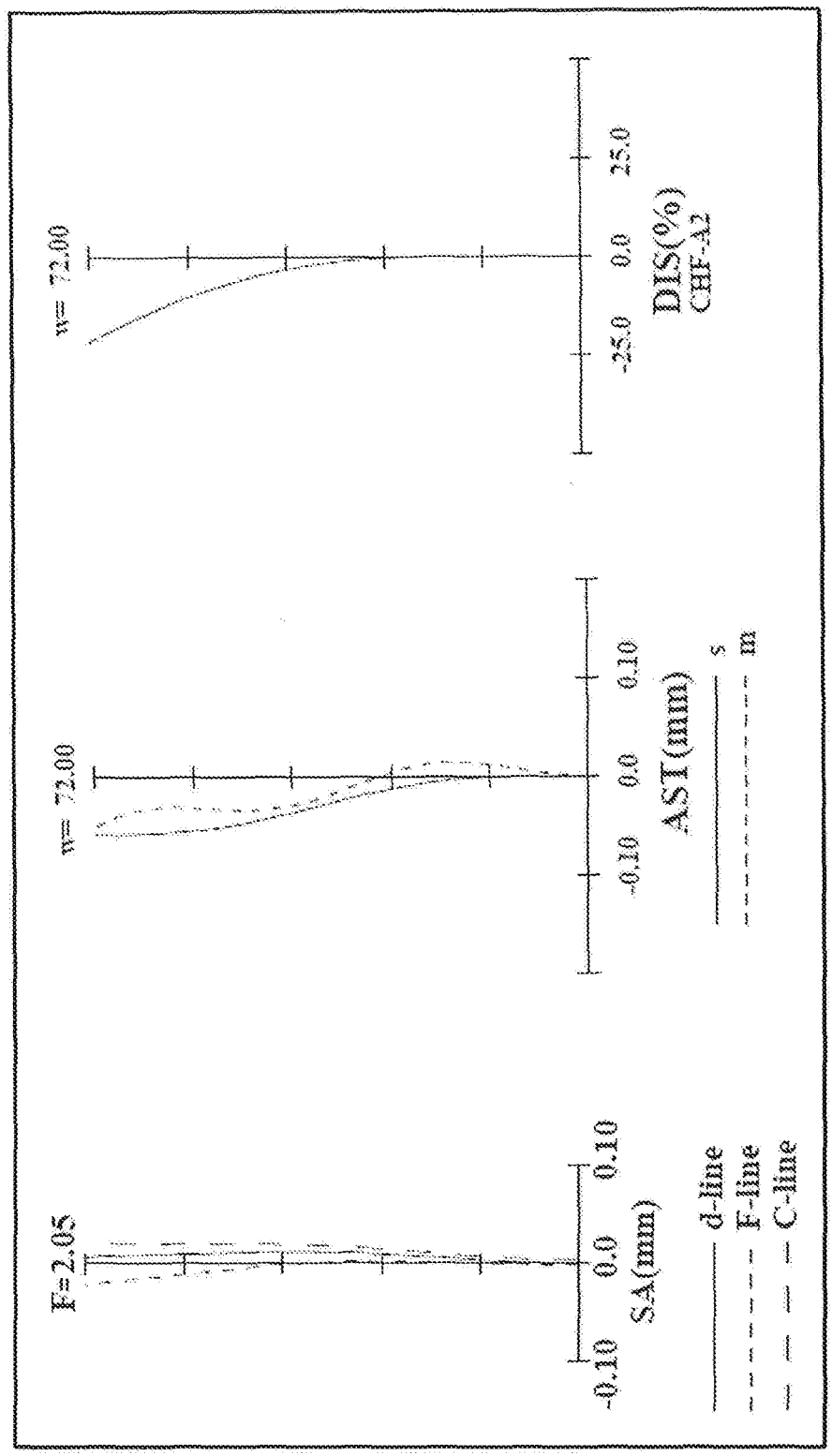
FIG. 6 is a longitudinal aberration diagram of the infinity in-focus condition of the single focal length lens system according to Numerical Example 3.

As shown in FIG. 5, the single focal length lens system according to Embodiment 3, in order from the object side to the image side, includes a first lens unit G1 having negative optical power, an aperture diaphragm A, and a second lens unit G2 having positive optical power.

The first lens unit G1, in order from the object side to the image side, includes a first lens element L1, a second lens element L2, and a third lens element L3. The second lens unit G2, in order from the object side to the image side, includes a fourth lens element L4 and a fifth lens element L5. The fourth lens element L4 and the fifth lens element L5 constitute a cemented lens element having an aspheric joint surface, and this cemented lens element has positive optical power.

In the first lens unit G1, the first lens element L1 and the second lens element L2 constitute a first sub-lens unit having negative optical power, and the third lens element L3 constitutes a second sub-lens unit having positive optical power.

The first lens element L1 is a lens element which has negative optical power and is made of glass. The first lens element L1 is a plano-concave lens element with the concave surface facing the image side.

The second lens element L2 is a lens element which has negative optical power and is made of resin. The second lens element L2 is a meniscus lens element with the convex surface facing the object side. The second lens element L2 has two aspheric surfaces.

The third lens element L3 is a lens element which has positive optical power and is made of glass. The third lens element L3 is a bi-convex lens element.

The fourth lens element L4 is a lens element which has negative optical power and is made of resin. The fourth lens element L4 is a meniscus lens element with the convex surface facing the object side. The fourth lens element L4 has two aspheric surfaces.

The fifth lens element L5 is a lens element which has positive optical power and is made of resin. The fifth lens element L5 is a bi-convex lens element. The fifth lens element L5 has two aspheric surfaces.

In the single focal length lens system according to Embodiment 3, a parallel plate CG is disposed on the object side relative to the image surface S (between the image surface S and the fifth lens element L5).

Embodiment 4

Figure 7:
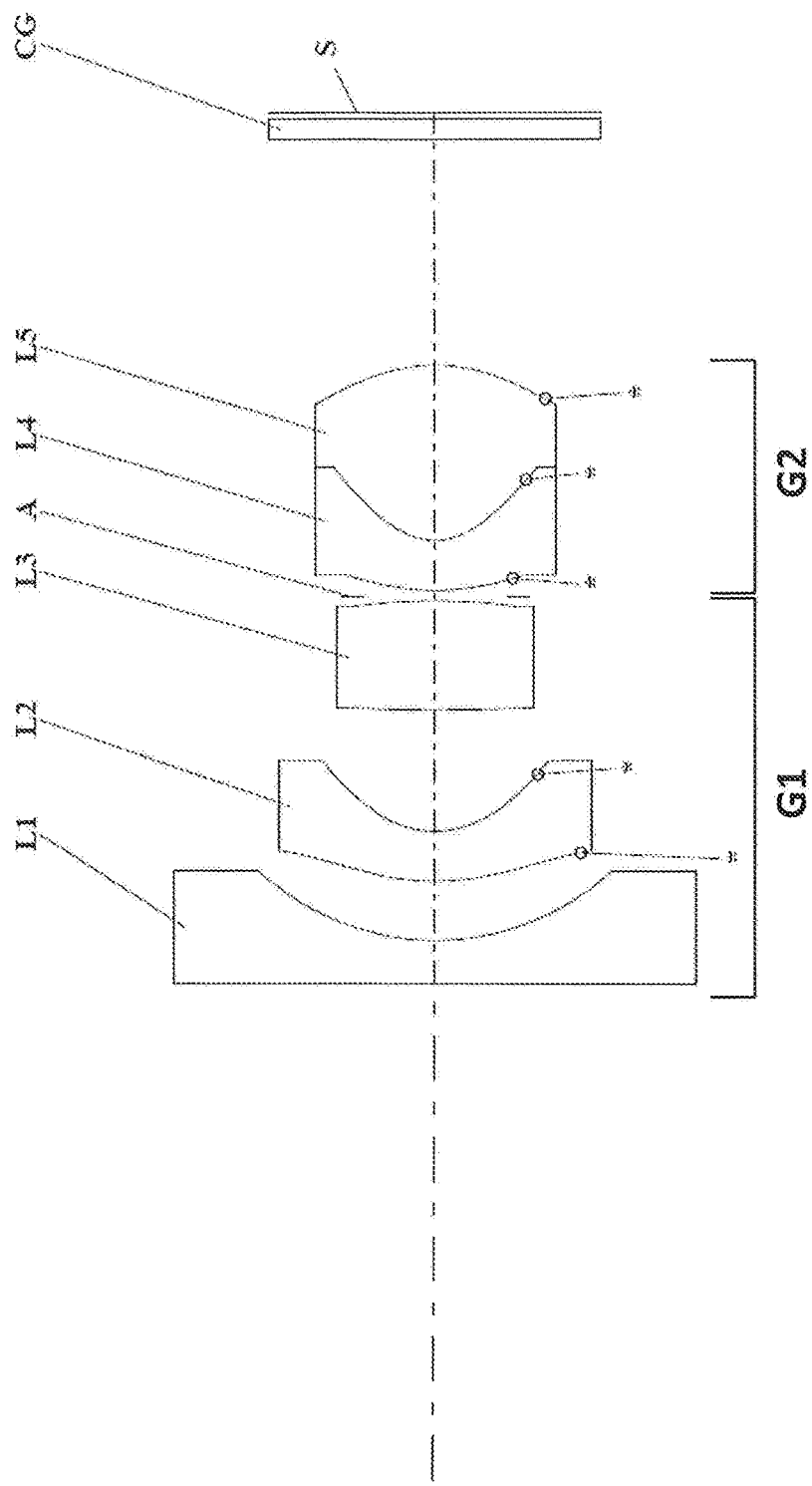
FIG. 7 is a lens arrangement diagram showing an infinity in-focus condition of a single focal length lens system according to Embodiment 4 (Numerical Example 4)
Figure 8:
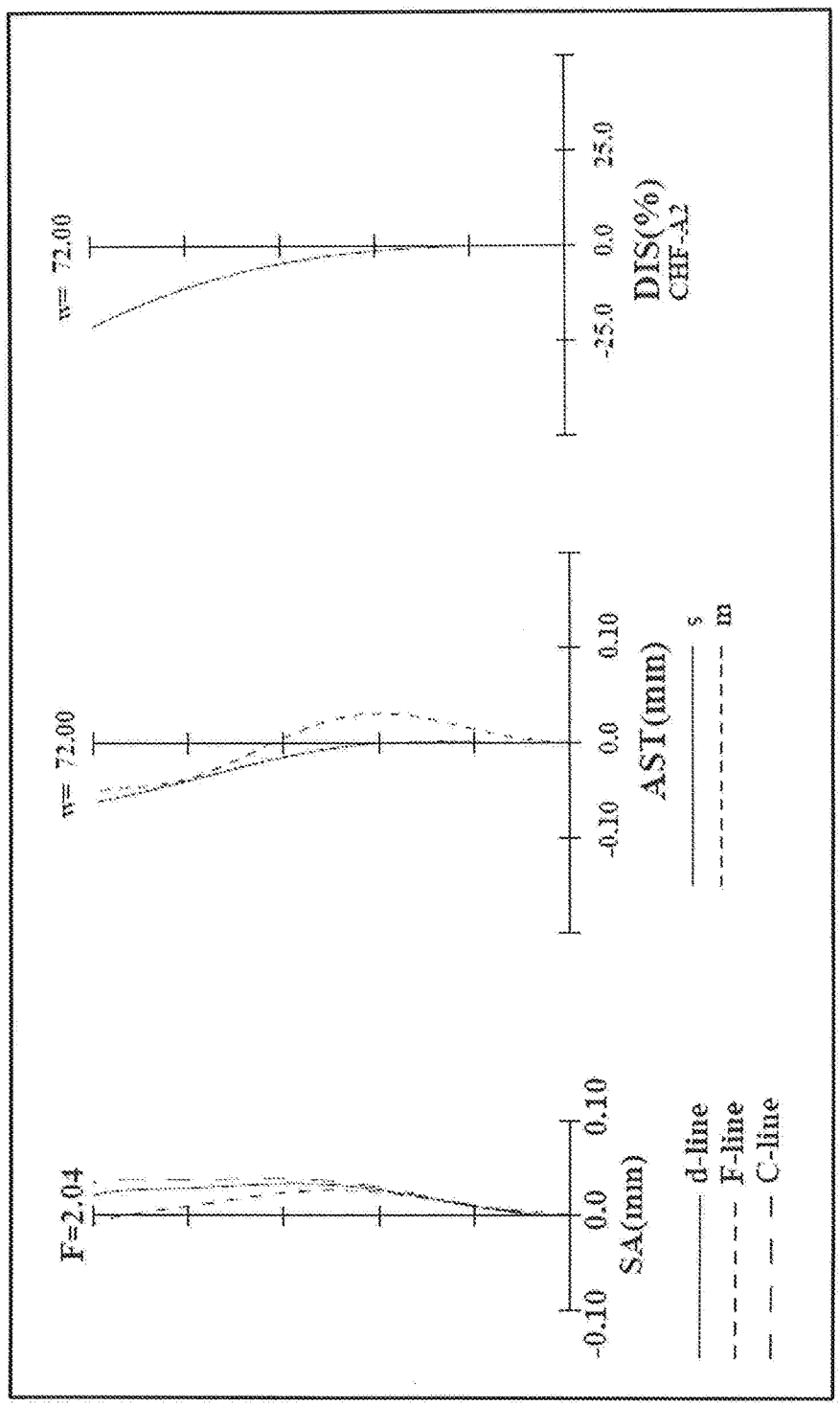
FIG. 8 is a longitudinal aberration diagram of the infinity in-focus condition of the single focal length lens system according to Numerical Example 4.

As shown in FIG. 7, the single focal length lens system according to Embodiment 4, in order from the object side to the image side, includes a first lens unit G1 having negative optical power, an aperture diaphragm A, and a second lens unit G2 having positive optical power.

The first lens unit G1, in order from the object side to the image side, includes a first lens element L1, a second lens element L2, and a third lens element L3. The second lens unit G2, in order from the object side to the image side, includes a fourth lens element L4 and a fifth lens element L5. The fourth lens element L4 and the fifth lens element L5 constitute a cemented lens element having an aspheric joint surface, and this cemented lens element has positive optical power.

In the first lens unit G1, the first lens element L1 and the second lens element L2 constitute a first sub-lens unit having negative optical power, and the third lens element L3 constitutes a second sub-lens unit having positive optical power.

The first lens element L1 is a lens element which has negative optical power and is made of glass. The first lens element L1 is a plano-concave lens element with the concave surface facing the image side.

The second lens element L2 is a lens element which has negative optical power and is made of resin. The second lens element L2 is a meniscus lens element with the convex surface facing the object side. The second lens element L2 has two aspheric surfaces.

The third lens element L3 is a lens element which has positive optical power and is made of glass. The third lens element L3 is a bi-convex lens element.

The fourth lens element L4 is a lens element which has negative optical power and is made of resin. The fourth lens element L4 is a meniscus lens element with the convex surface facing the object side. The fourth lens element L4 has two aspheric surfaces.

The fifth lens element L5 is a lens element which has positive optical power and is made of resin. The fifth lens element L5 is a bi-convex lens element. The fifth lens element L5 has two aspheric surfaces.

In the single focal length lens system according to Embodiment 4, a parallel plate CG is disposed on the object side relative to the image surface S (between the image surface S and the fifth lens element L5).

Embodiment 5

Figure 9:
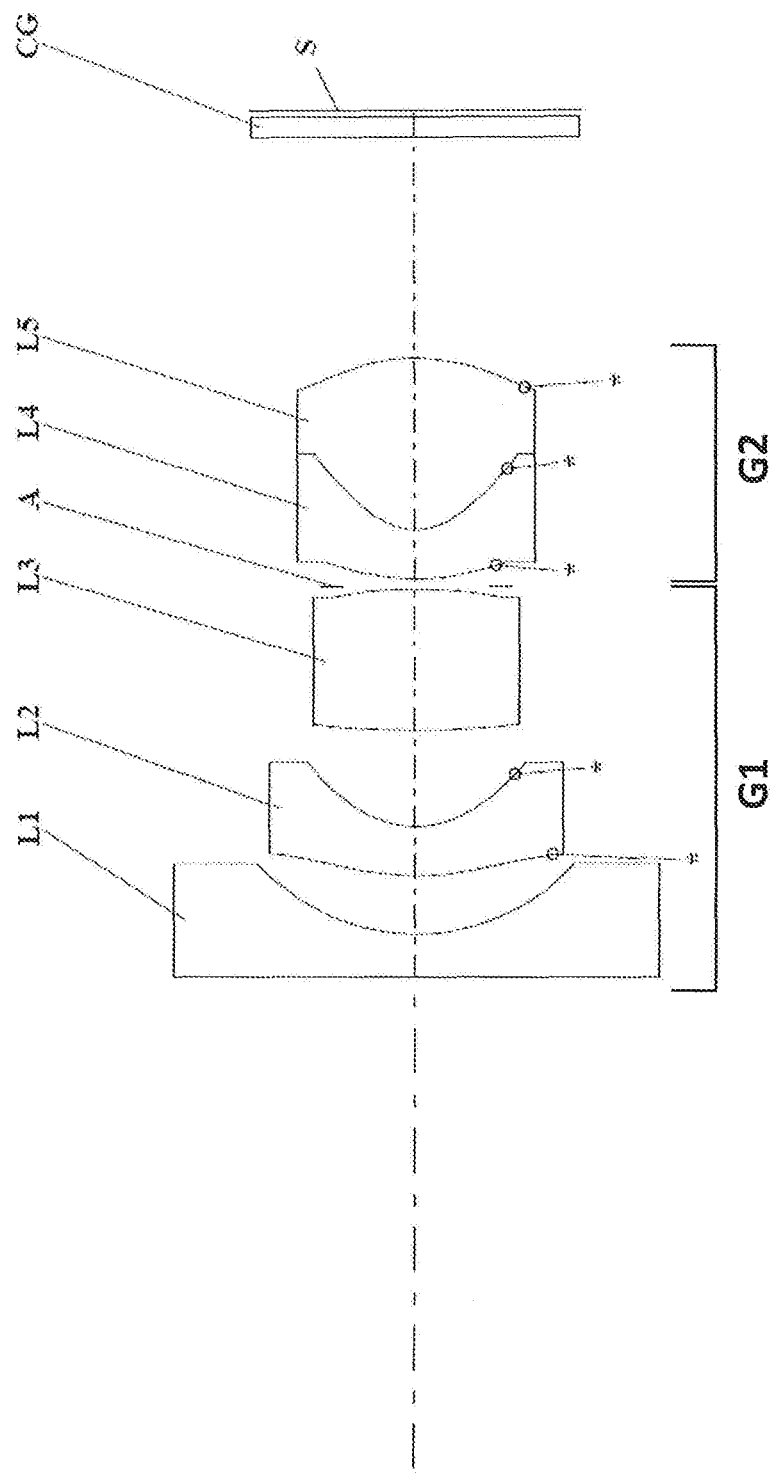
FIG. 9 is a lens arrangement diagram showing an infinity in-focus condition of a single focal length lens system according to Embodiment 5 (Numerical Example 5)
Figure 10:
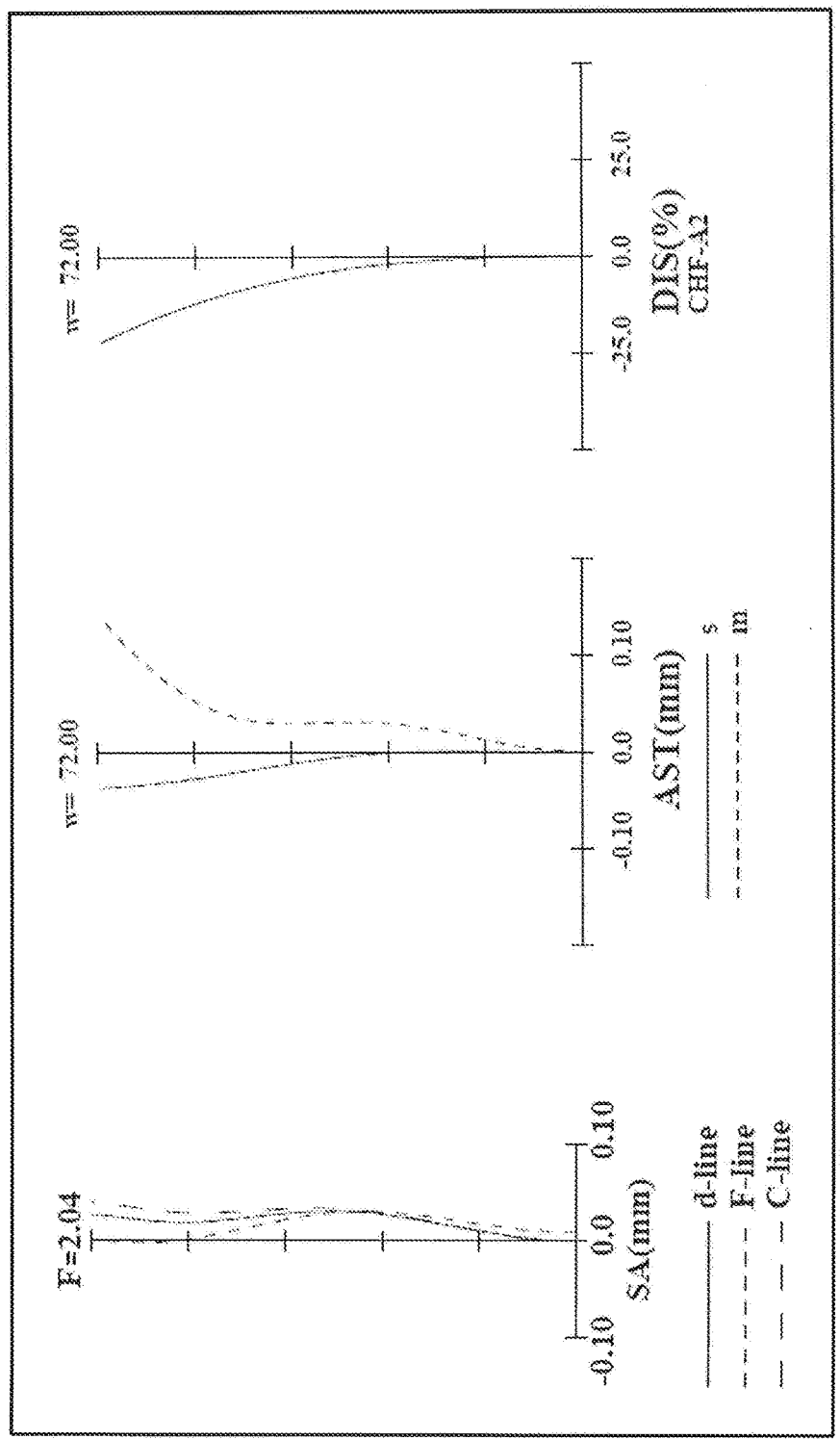
FIG. 10 is a longitudinal aberration diagram of the infinity in-focus condition of the single focal length lens system according to Numerical Example 5.

As shown in FIG. 9, the single focal length lens system according to Embodiment 5, in order from the object side to the image side, includes a first lens unit G1 having negative optical power, an aperture diaphragm A, and a second lens unit G2 having positive optical power.

The first lens unit G1, in order from the object side to the image side, includes a first lens element L1, a second lens element L2, and a third lens element L3. The second lens unit G2, in order from the object side to the image side, includes a fourth lens element L4 and a fifth lens element L5. The fourth lens element L4 and the fifth lens element L5 constitute a cemented lens element having an aspheric joint surface, and this cemented lens element has positive optical power.

In the first lens unit G1, the first lens element L1 and the second lens element L2 constitute a first sub-lens unit having negative optical power, and the third lens element L3 constitutes a second sub-lens unit having positive optical power.

The first lens element L1 is a lens element which has negative optical power and is made of resin. The first lens element L1 is a plano-concave lens element with the concave surface facing the image side.

The second lens element L2 is a lens element which has negative optical power and is made of resin. The second lens element L2 is a meniscus lens element with the convex surface facing the object side. The second lens element L2 has two aspheric surfaces.

The third lens element L3 is a lens element which has positive optical power and is made of glass. The third lens element L3 is a bi-convex lens element.

The fourth lens element L4 is a lens element which has negative optical power and is made of resin. The fourth lens element L4 is a meniscus lens element with the convex surface facing the object side. The fourth lens element L4 has two aspheric surfaces.

The fifth lens element L5 is a lens element which has positive optical power and is made of resin. The fifth lens element L5 is a bi-convex lens element. The fifth lens element L5 has two aspheric surfaces.

In the single focal length lens system according to Embodiment 5, a parallel plate CG is disposed on the object side relative to the image surface S (between the image surface S and the fifth lens element L5).

Embodiment 6

Figure 11:
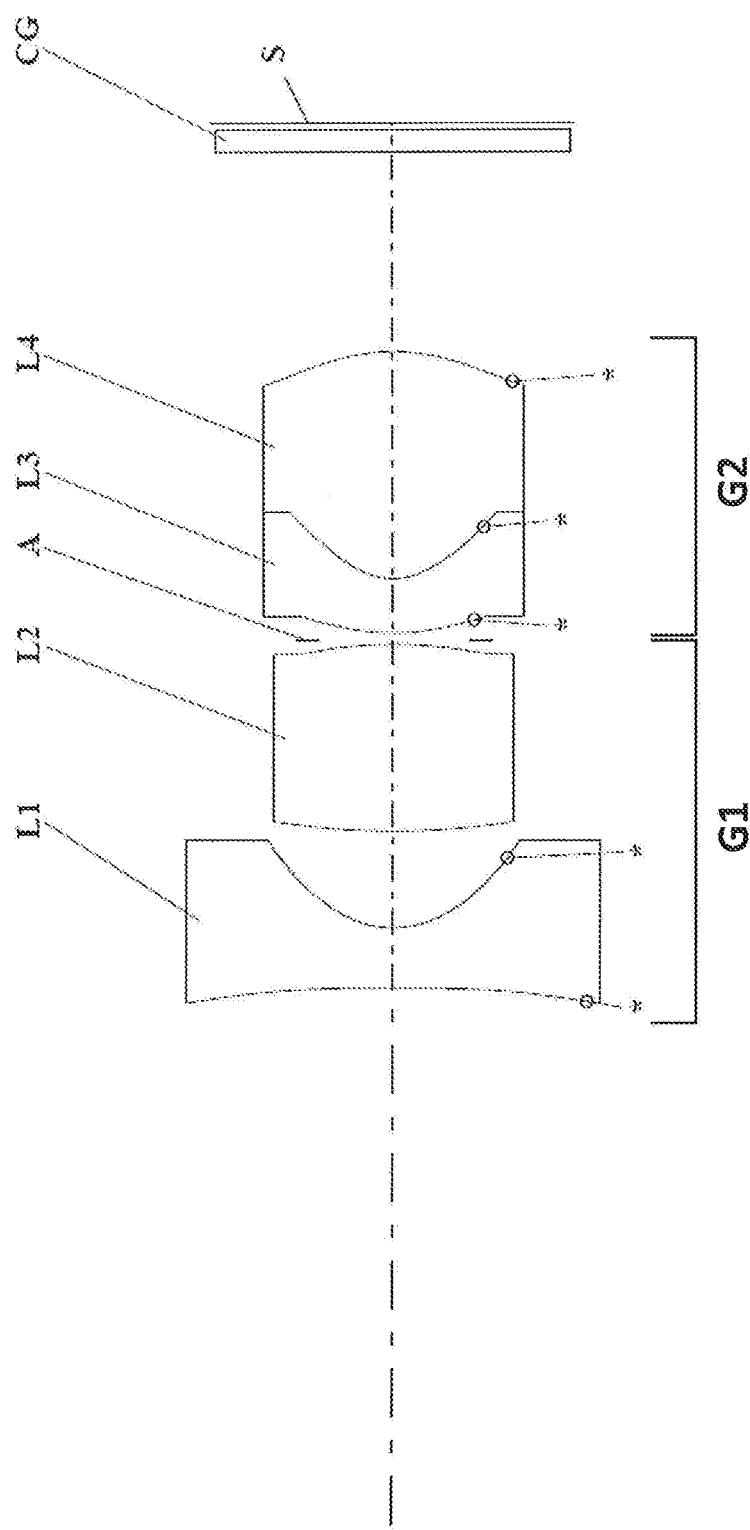
FIG. 11 is a lens arrangement diagram showing an infinity in-focus condition of a single focal length lens system according to Embodiment 6 (Numerical Example 6)
Figure 12:
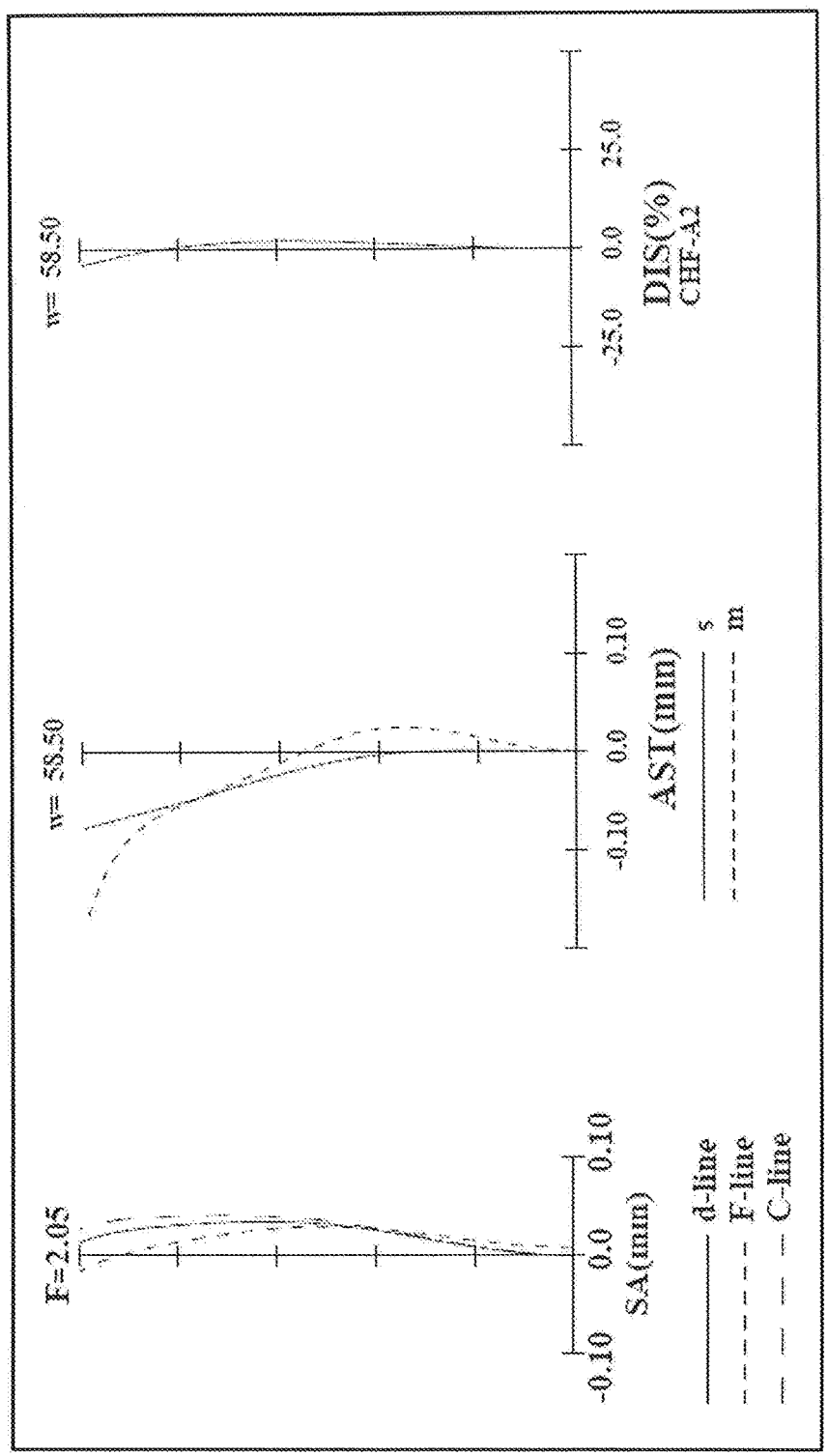
FIG. 12 is a longitudinal aberration diagram of the infinity in-focus condition of the single focal length lens system according to Numerical Example 6.

As shown in FIG. 11, the single focal length lens system according to Embodiment 6, in order from the object side to the image side, includes a first lens unit G1 having negative optical power, an aperture diaphragm A, and a second lens unit G2 having positive optical power.

The first lens unit G1, in order from the object side to the image side, includes a first lens element L1 and a second lens element L2. The second lens unit G2, in order from the object side to the image side, includes a third lens element L3 and a fourth lens element L4. The third lens element L3 and the fourth lens element L4 constitute a cemented lens element having an aspheric joint surface, and this cemented lens element has positive optical power.

In the first lens unit G1, the first lens element L1 constitutes a first sub-lens unit having negative optical power, and the second lens element L2 constitutes a second sub-lens unit having positive optical power.

The first lens element L1 is a lens element which has negative optical power and is made of resin. The first lens element L1 is a bi-concave lens element. The first lens element L1 has two aspheric surfaces.

The second lens element L2 is a lens element which has positive optical power and is made of glass. The second lens element L2 is a bi-convex lens element.

The third lens element L3 is a lens element which has negative optical power and is made of resin. The third lens element L3 is a meniscus lens element with the convex surface facing the object side. The third lens element L3 has two aspheric surfaces.

The fourth lens element L4 is a lens element which has positive optical power and is made of resin. The fourth lens element L4 is a bi-convex lens element. The fourth lens element L4 has two aspheric surfaces.

In the single focal length lens system according to Embodiment 6, a parallel plate CG is disposed on the object side relative to the image surface S (between the image surface S and the fourth lens element L4).

Embodiment 7

Figure 13:
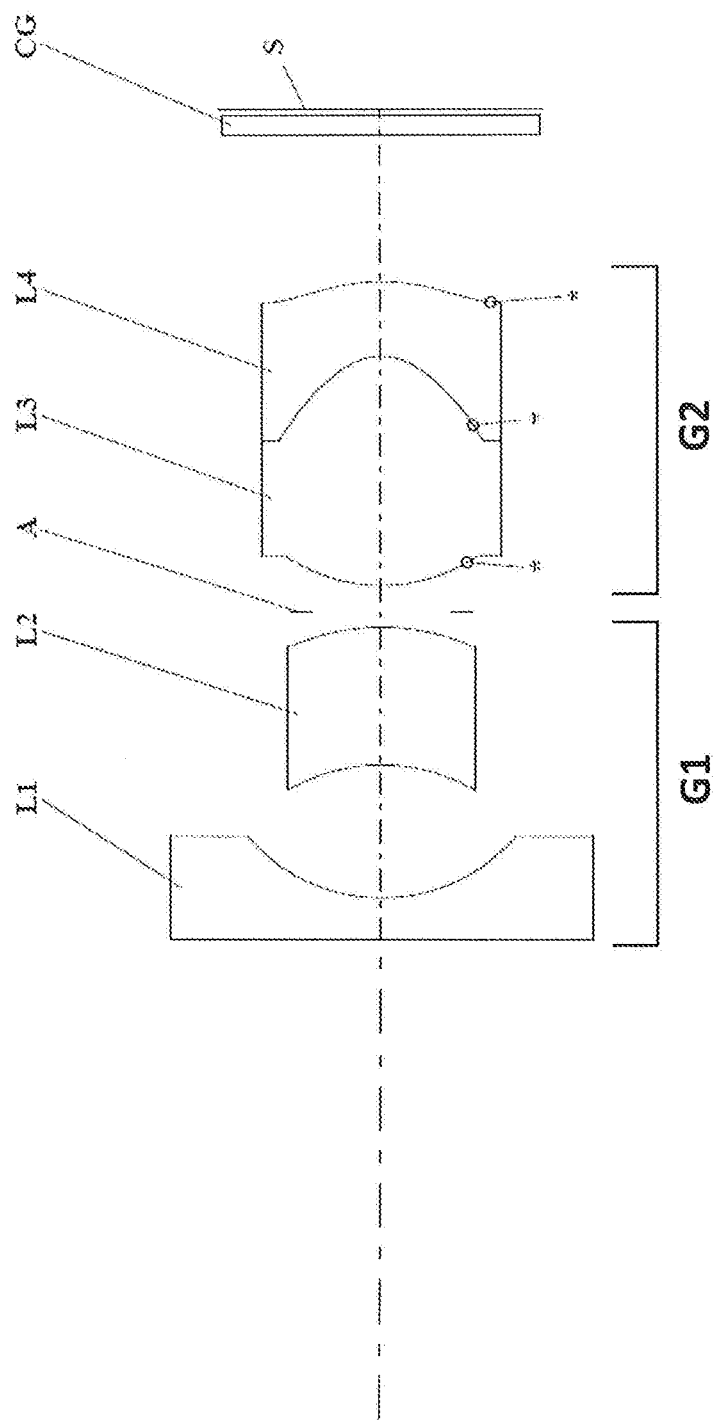
FIG. 13 is a lens arrangement diagram showing an infinity in-focus condition of a single focal length lens system according to Embodiment 7 (Numerical Example 7)
Figure 14:
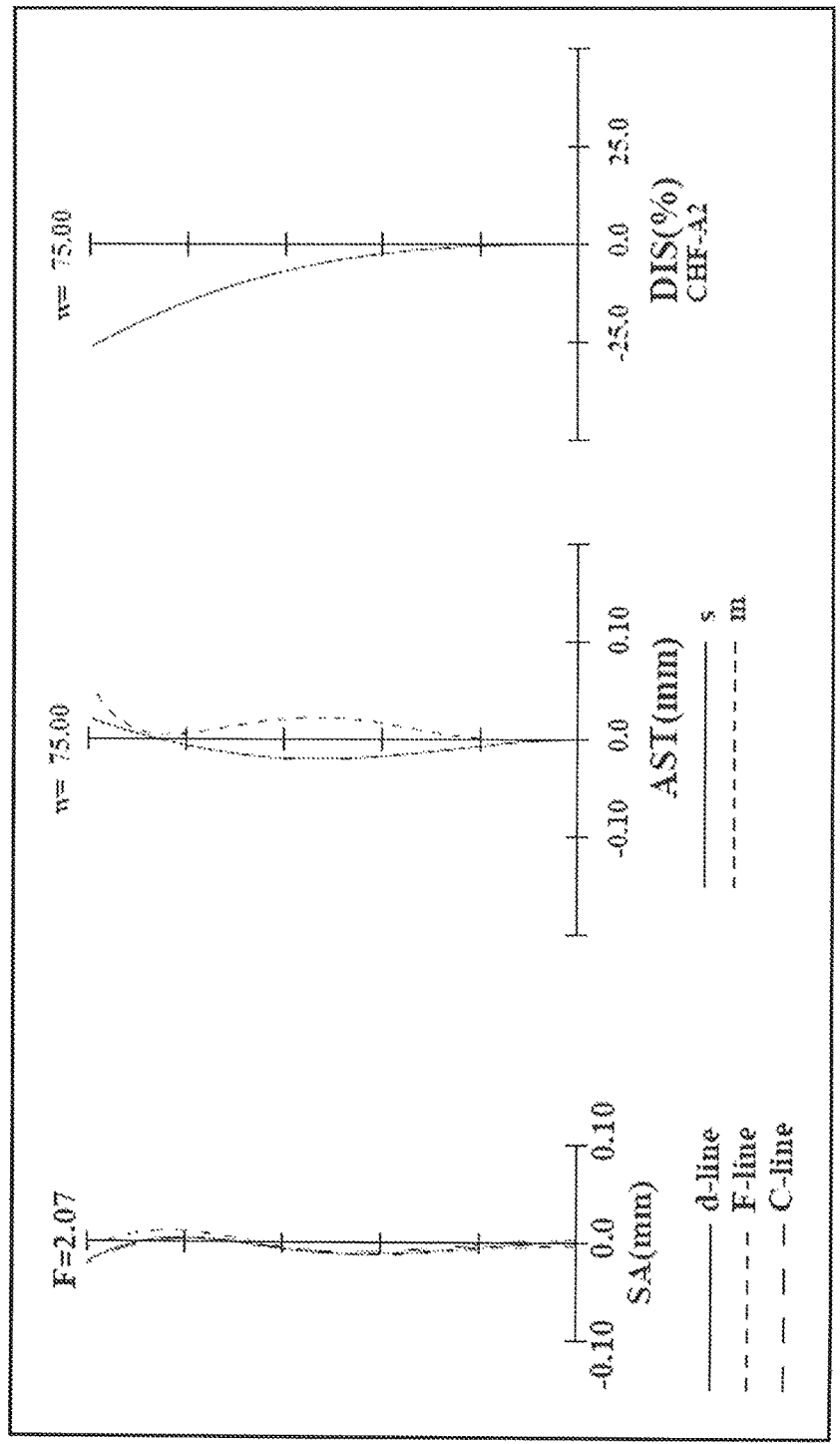
FIG. 14 is a longitudinal aberration diagram of the infinity in-focus condition of the single focal length lens system according to Numerical Example 7.

As shown in FIG. 13, the single focal length lens system according to Embodiment 7, in order from the object side to the image side, includes a first lens unit G1 having negative optical power, an aperture diaphragm A, and a second lens unit G2 having positive optical power.

The first lens unit G1, in order from the object side to the image side, includes a first lens element L1 and a second lens element L2. The second lens unit G2, in order from the object side to the image side, includes a third lens element L3 and a fourth lens element L4. The third lens element L3 and the fourth lens element L4 constitute a cemented lens element having an aspheric joint surface, and this cemented lens element has positive optical power.

In the first lens unit G1, the first lens element L1 constitutes a first sub-lens unit having negative optical power, and the second lens element L2 constitutes a second sub-lens unit having positive optical power.

The first lens element L1 is a lens element which has negative optical power and is made of resin. The first lens element L1 is a plano-concave lens element with the concave surface facing the image side.

The second lens element L2 is a lens element which has positive optical power and is made of glass. The second lens element L2 is a meniscus lens element with the convex surface facing the image side.

The third lens element L3 is a lens element which has positive optical power and is made of resin. The third lens element L3 is a bi-convex lens element. The third lens element L3 has two aspheric surfaces.

The fourth lens element L4 is a lens element which has negative optical power and is made of resin. The fourth lens element L4 is a meniscus lens element with the convex surface facing the image side. The fourth lens element L4 has two aspheric surfaces.

In the single focal length lens system according to Embodiment 7, a parallel plate CG is disposed on the object side relative to the image surface S (between the image surface S and the fourth lens element L4).

Expanded Examples of Embodiments 1 to 7

Embodiments 1 to 7 have been described above as examples of the technology disclosed in the present application. However, the technology in the present disclosure is not limited thereto, and is also applicable to embodiments in which changes, substitutions, additions, omissions, and/or the like are made as appropriate.

For example, the following materials may be adopted instead of the material of the second sub-lens unit (the lens element located on the object side relative to the aperture diaphragm A) exemplified in Embodiments 1 to 7. The purpose of adopting the following materials is to allow a relative refractive index temperature coefficient in an atmosphere at 0 to 20° C. with respect to light having a wavelength range of 580 to 640 nm to satisfy a predetermined condition described later. The materials of the cemented lens elements are not limited to those described below, and any material may be adopted as long as it is suited to the above purpose.

Alternatives of glass materials adoptable for the lens element constituting the second sub-lens unit are as follows:
a) HOYA Corporation
  Glass name: FD60, FD110, FF8, E-FD13,
  E-FD10, E-FD4, FD140, FDS24,
  M-FDS1, TAFD40, FDS18,
  TAFD55, M-FDS2, E-FDS2,
  E-FDS3
b) Sumita Optical Glass Inc.
  Glass name: K-PSFn3, K-SFLD66, K-SFLD6,
  K-SFLDn3, K-SFLD11, K-CD120,
  K-SFLD14, K-SFLD4, K-SFLD1,
  K-PSFn1, K-PSFn4, K-PSFn5,
  K-PSFn2, K-PSFn203, K-SFLD10
c) Ohara Corporation
  Glass name: S-NPH1, S-NPH53, S-TIH6,
  S-TIH53, S-TIH11, S-TIH23,
  S-TIH14, S-NPH2, S-TIH4,
  S-TIH3, S-TIH13, S-TIH18,
  S-TIH10, S-NPH3, S-TIH1,
  S-NBH55, S-LAH79

The following description is given for beneficial conditions that a single focal length lens system like the single focal length lens systems according to Embodiments 1 to 7 can satisfy. Here, a plurality of beneficial conditions are set forth for the single focal length lens system according to each embodiment. A construction that satisfies all the plurality of conditions is most effective for the single focal length lens system. However, when an individual condition is satisfied, a single focal length lens system having the corresponding effect can be obtained.

For example, like the single focal length lens systems according to Embodiments 1 to 7, a single focal length lens system according to the present disclosure, in order from the object side to the image side, includes a first lens unit having optical power, an aperture diaphragm, and a second lens unit having positive optical power. The first lens unit, in order from the object side to the image side, includes a first sub-lens unit having negative optical power and a second sub-lens unit having positive optical power. The first sub-lens unit includes at least one lens element. Among the lens elements, a lens element having the greatest negative optical power is made of resin. The second lens unit is composed of a cemented lens element. The cemented lens element is obtained by cementing at least two lens elements made of resin. Hereinafter, this lens configuration is referred to as a basic configuration of the embodiments.

Since the second lens unit is composed of the cemented lens element, chromatic aberration can be satisfactorily compensated for.

The single focal length lens system having the basic configuration satisfies the following condition (1-1):

$$|dn/dt|_{MAX} \leq 2.67 \times 10^{-5} \quad (1\text{-}1)$$

where $|dn/dt|_{MAX}$ is a maximum value of absolute values of relative refractive index temperature coefficients in the atmosphere at 0 to 20° C. with respect to light having a wavelength range of 580 to 640 nm, which is calculated for each lens element constituting the second sub-lens unit.

The condition (1-1) is a condition regarding the relative refractive index temperature coefficient of each lens element constituting the second sub-lens unit. In the single focal length lens system having the basic configuration, first, defocusing in the optical axis direction, which is caused by that the refractive index of the lens element changes when the temperature changes, can be canceled by the first sub-lens unit having negative optical power and the second lens unit having positive optical power. Therefore, as the lens elements constituting the first sub-lens unit and the second lens unit, a lens element made of resin, the refractive index of which changes relatively greatly when the temperature changes, can be positively used, thereby realizing cost reduction. Further, when the condition (1-1) is satisfied, the relative refractive index temperature coefficient of the second sub-lens unit having positive optical power can be reduced. Therefore, it is possible to reduce defocusing in the optical axis direction which is caused by that the refractive index of the lens element changes when the temperature changes.

When the following condition (1-1)' is satisfied, the above effect can be achieved more successfully:

$$|dn/dt|_{MAX} \leq 1.50 \times 10^{-5} \quad (1\text{-}1)'$$

Regarding the defocusing in the optical axis direction which is caused by that the refractive index of the lens element changes when the temperature changes, it is beneficial to satisfy the following condition (a):

$$|dBF/f| \leq 3.50 \times 10^{-4} \quad (a)$$

where dBF is defocusing in the optical axis direction which is caused by a change in the refractive index of each lens element per temperature change of 1° C., and f is a focal length at d-line of the entire system.

In single focal length lens systems according to Numerical Examples 1 to 7 described later, the above condition (a) is satisfied when the above condition (1-1) is satisfied.

In the present disclosure, for simplification, exponent notation defined in JIS X 0210 "Representation of Numerical Values in Character Strings for Information Interchange" may be used. For example, "2.67×10$^{-5}$" is expressed as "2.67E-05".

It is beneficial that a single focal length lens system having the basic configuration like the single focal length lens system according to Embodiments 1 to 7 satisfies the following condition (2):

$$2\omega_{DIA} \geq 90 \quad (2)$$

where $2\omega_{DIA}$ is a diagonal angle of view (°).

The condition (2) is a condition regarding the diagonal angle of view of the single focal length lens system. In the single focal length lens system according to the present disclosure, defocusing in the optical axis direction, which is caused by that the refractive index of the lens element changes when the temperature changes, can be reduced while satisfying the condition (2).

The single focal length lens system according to the present disclosure can also achieve the above effect by satisfying the following condition (2)':

$$2\omega_{DIA} \geq 100 \quad (2)'$$

The single focal length lens systems according to Numerical Examples 1 to 7 described later realize a wider angle of view while maintaining excellent optical performance by satisfying the condition (2).

When a camera equipped with the single focal length lens system according to the present disclosure is installed in a position on the rear side of the body of an automobile to be used as an in-vehicle camera for checking a rear view, it is beneficial that the diagonal angle of view is large and that the horizontal angle of view is also large to some extent.

Figure 16:
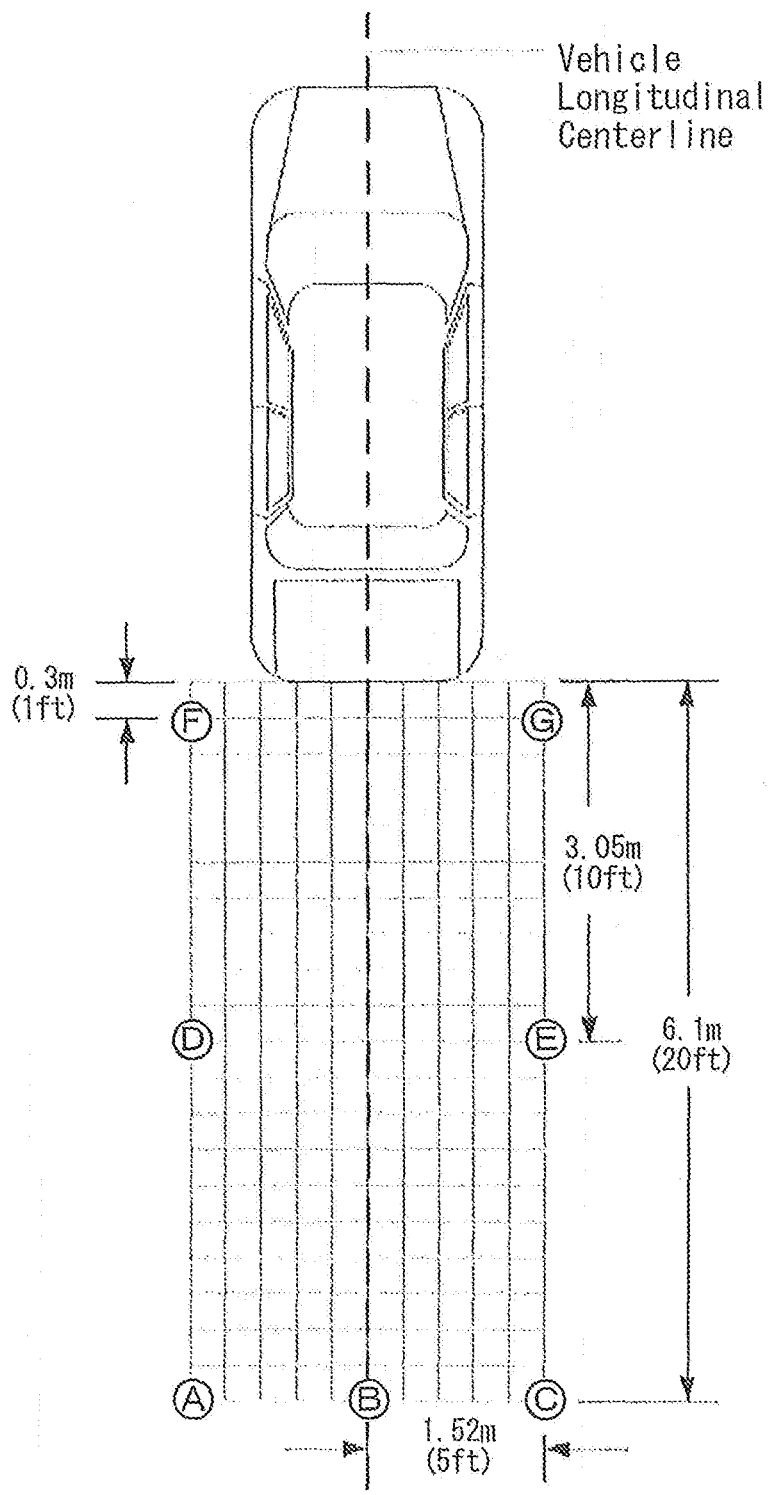
FIG. 16 is a schematic diagram showing: the automobile having the in-vehicle camera at a position on the rear side thereof; points where it is determined whether visual recognition of the back view of the automobile on the basis of an image captured by the in-vehicle camera is possible; and a region including the points.

For example, according to an advisory from National Highway Traffic Safety Administration in the USA, as shown in a schematic view of FIG. 16, there are seven points A to G at which it is determined whether visual recognition of a rear view behind a vehicle by an in-vehicle camera is possible or not, and a range including the seven points A to G has a size of 3.04 m×6.10 m. That is, installation of an in-vehicle camera capable of providing an image (video) with which a driver can visually recognize an object, a person, or the like existing in the range of about 3 m×6 m on the rear side of the vehicle, is going to be mandatory in the USA.

In the case where an image (video) with which a driver can visually recognize an object, a person, or the like having a height of about 80 cm (as high as the average height of infants), for example, is provided at two points F and G closest to the vehicle among the seven points A to G, it is beneficial that the single focal length lens system mounted to the in-vehicle camera satisfies the following condition (b):

$$2\omega_{HOR} \geq 176 \quad (b)$$

where $2\omega_{HOR}$ is a horizontal angle of view (°)

The horizontal angle of view of each of the single focal length lens systems according to Numerical Examples 1 to 7 shown in Table 22 later is a value calculated on the assumption that the ratio of the horizontal width to the vertical width of an imaging device included in the camera according to the present disclosure is 4:3 (=horizontal width: vertical width). When it is assumed that the ratio is 16:9 (=horizontal width:vertical width), the horizontal angle of view of the single focal length lens system becomes wider.

In a single focal length lens system having the basic configuration like the single focal length lens systems according to Embodiments 1 to 4, it is beneficial that the first lens unit includes a lens element made of glass and located at a position closest to the object side. Thus, by locating the lens element made of glass at the position closest to the object side in the entire system, environmental resistance of the single focal length lens system can be improved.

A single focal length lens system having the basic configuration like the single focal length lens systems according to Embodiments 1 to 7, in which the cemented lens element of the second lens unit is composed of a lens element having negative optical power (hereinafter sometimes abbreviated as a negative lens element) and a lens element having positive optical power (hereinafter sometimes abbreviated as a positive lens element), and the joint surface of the cemented lens element is an aspheric surface, can satisfactorily compensate for chromatic aberration, and beneficially satisfies the following condition (3):

$$1.5 \leq f_{G2}/f \leq 3.5 \quad (3)$$

where $f_{G2}$ is a focal length at d-line of the second lens unit, and
f is the focal length at d-line of the entire system.

The condition (3) is a condition regarding the ratio of the focal length of the second lens unit to the focal length of the entire single focal length lens system. When the condition (3) is satisfied, the optical power of the cemented lens element in the single focal length lens system can be adjusted to an appropriate value, thereby realizing a compact single focal length lens system having excellent aberration performance. When the value exceeds the upper limit of the condition (3), the optical power of the cemented lens element becomes excessively small and the overall length of the lens system is increased, which makes it difficult to reduce the size of the single focal length lens system. When the value goes below the lower limit of the condition (3), the optical power of the cemented lens element becomes excessively large and generated aberrations become large, which makes appropriate aberration compensation difficult.

When at least one of the following conditions (3)' and (3)" is satisfied, the above effect can be achieved more successfully:

$$1.8 \leq f_{G2}/f \quad (3)'$$

$$f_{G2}/f \leq 3.0 \quad (3)''$$

The single focal length lens systems according to Numerical Examples 1 to 7 described later achieve both further size reduction and maintenance of excellent aberration performance by satisfying the condition (3).

A single focal length lens system having the basic configuration like the single focal length lens systems according to Embodiments 1 to 7, in which a lens element included in the first sub-lens unit and having the greatest negative optical power has a concave surface facing the image side, can realize a wider angle of view, and beneficially satisfies the following condition (4):

$$-3.5 \leq f_{LN}/f \leq -0.5 \quad (4)$$

where $f_{LN}$ is a focal length at d-line of the lens element included in the first sub-lens unit and having the greatest negative optical power, and
f is the focal length at d-line of the entire system.

The condition (4) is a condition regarding the ratio of the focal length of the lens element included in the first sub-lens unit and having the greatest negative optical power, to the focal length of the entire single focal length lens system. When the condition (4) is satisfied, a lens element made of resin and having a relatively great relative refractive index temperature coefficient can be positively used as the lens element included in the first sub-lens unit and having the greatest negative optical power. By using the lens element having the greatest negative optical power and the second lens unit having positive optical power and composed of the lens element made of resin, it is possible to appropriately cancel defocusing in the optical axis direction which is caused by that the refractive index of the lens element changes when the temperature changes. Further, cost reduction can be achieved by using the lens element made of resin. When the condition (4) is not satisfied, it is difficult to appropriately cancel defocusing in the optical axis direction which is caused by that the refractive index of the lens element changes when the temperature changes.

When at least one of the following conditions (4)' and (4)" is satisfied, the above effect can be achieved more successfully:

$$-3.0 \leq f_{LN}/f \quad (4)'$$

$$f_{LN}/f \leq -1.0 \quad (4)''$$

The single focal length lens systems according to Numerical Examples 1 to 7 described later appropriately cancel defocusing in the optical axis direction which occurs in the second lens unit when the temperature changes, and reduce defocusing in the optical axis direction in the entire system, by satisfying the condition (4).

A single focal length lens system having the basic configuration like the single focal length lens systems according to Embodiments 1 to 7, in which the second sub-lens unit is composed of a single positive lens element, can reduce the number of lens elements, thereby realizing cost reduction. In addition, when the positive lens element constituting the second sub-lens unit has an aspheric surface, it is also possible to realize more satisfactory aberration performance. This single focal length lens system beneficially satisfies the following condition (5):

$$vd_{LP} < 35 \tag{5}$$

where $vd_{LP}$ is an Abbe number at d-line of the positive lens element in the second sub-lens unit.

The condition (5) is a condition regarding the Abbe number of the positive lens element constituting the second sub-lens unit. When the condition (5) is satisfied, chromatic aberration in the entire single focal length lens system can be satisfactorily compensated for. When the value exceeds the upper limit of the condition (5), both the axial chromatic aberration and the magnification chromatic aberration are increased, which makes satisfactory aberration compensation difficult.

When the following condition (5)' is satisfied, the above effect can be achieved more successfully:

$$vd_{LP} < 30 \tag{5}'$$

The single focal length lens systems according to Numerical Examples 1 to 7 described later realize more satisfactory aberration performance by satisfying the condition (5).

In a single focal length lens system like the single focal length lens systems according to Embodiments 6 to 7, which includes an aperture diaphragm, a first lens unit disposed on the object side relative to the aperture diaphragm, and a second lens unit disposed on the image side relative to the aperture diaphragm, in which the first lens unit includes a first lens element which is made of resin and has negative optical power and a second lens element which is disposed on the image side relative to the first lens element, is made of glass, and has positive optical power, and the second lens unit includes a cemented lens element which is obtained by cementing at least two lens elements made of resin, and has positive optical power, it is beneficial that the second lens element satisfies the following condition (1-2):

$$|dn/dt|_{L2} \leq 2.67 \times 10^{-5} \tag{1-2}$$

where $|dn/dt|_{L2}$ is an absolute value of a relative refractive index temperature coefficient in the atmosphere at 0 to 20° C. with respect to light having a wavelength range of 580 to 640 nm, which is calculated for the second lens element.

The condition (1-2) is a condition regarding the relative refractive index temperature coefficient of the second lens element constituting the first lens unit. In the single focal length lens system having this configuration, first, defocusing in the optical axis direction, which is caused by that the refractive index of the lens element changes when the temperature changes, can be canceled by the first lens element having negative optical power and the second lens unit having positive optical power. Therefore, as the lens elements constituting the first lens element and the second lens unit, a lens element made of resin, the refractive index of which changes relatively greatly when the temperature changes, can be positively used, thereby realizing cost reduction. Further, when the condition (1-2) is satisfied, the relative refractive index temperature coefficient of the second lens element having positive optical power can be reduced. Therefore, it is possible to reduce defocusing in the optical axis direction in the entire system, which is caused by that the refractive index of the lens element changes when the temperature changes.

When the following condition (1-2)' is satisfied, the above effect can be achieved more successfully:

$$|dn/dt|_{L2} \leq 1.50 \times 10^{-5} \tag{1-2}'$$

Regarding the defocusing in the optical axis direction which is caused by that the refractive index of the lens element changes when the temperature changes, it is beneficial to satisfy the above condition (a).

In single focal length lens systems according to Numerical Examples 6 to 7 described later, the above condition (a) is satisfied when the above condition (1-2) is satisfied.

Embodiment 8: Camera and Automobile

As an example of a camera equipped with the single focal length lens system according to Embodiment 1, an in-vehicle camera will be described. In the in-vehicle camera, any one of the single focal length lens systems according to Embodiments 2 to 7 may be applied instead of the single focal length lens system according to Embodiment 1. Among the single focal length lens systems according to Embodiments 1 to 7, the single focal length lens systems according to Embodiments 1 to 4 are particularly beneficial as lens systems for in-vehicle cameras because each of these lens systems includes a lens element made of glass and disposed at a position closest to the object side in the entire system, and has more improved environmental resistance.

Figure 15:
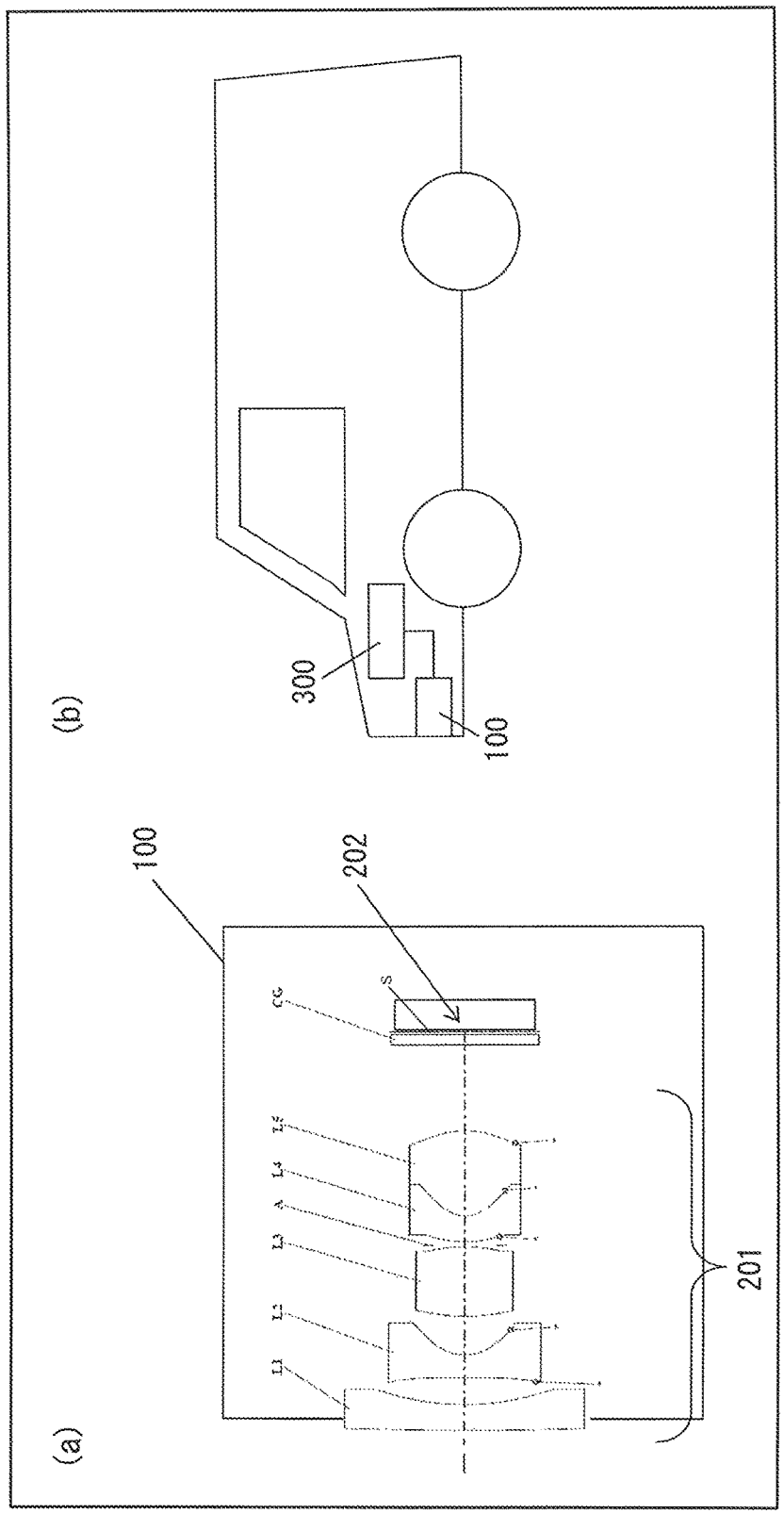
FIG. 15 is a schematic diagram showing an in-vehicle camera including the single focal length lens system according to Embodiment 1, and an automobile having the in-vehicle camera at a position on the front side thereof.

FIG. 15(a) is a schematic diagram showing an in-vehicle camera equipped with the single focal length lens system according to Embodiment 1. The in-vehicle camera 100 includes the single focal length lens system 201, and an imaging device 202 which captures an image of light converged by the single focal length lens system 201.

The in-vehicle camera 100 is mounted on a vehicle, and is used as a sensing camera or a view camera. An image captured by the sensing camera is used for checking a distance between the vehicle and another vehicle. An image captured by the view camera is displayed on a monitor installed in the vehicle, and is used by a driver to check the views in front of and behind the vehicle.

The single focal length lens system according to the present disclosure is a lens system in which the temperature characteristics are considered, and significant widening of the diagonal angle of view to 90° or more is achieved. Therefore, the single focal length lens system can suppress occurrence of aberrations in the captured image due to temperature change as much as possible, and is effective as a lens system for the sensing camera.

Next, as an example of an automobile according to the present disclosure, an automobile equipped with the above sensing camera will be described.

FIG. 15(b) is a schematic diagram showing an automobile having the camera at a position on the front side thereof. The automobile has the in-vehicle camera 100 at a position on the front side thereof, and includes a processing unit (CPU) 300 which detects the external environment on the basis of the image captured by the imaging device 202 included in the in-vehicle camera 100, and controls each part.

The imaging device 202 receives the optical image formed by the single focal length lens system 201, and converts the optical image into an electric image signal. The CPU 300 acquires the image signal, and checks the distance between the own automobile and a preceding automobile, presence of a pedestrian, and the like. Based on the check result, the CPU notifies the driver of presence of a pedestrian, or automatically brakes the automobile. Further, the CPU 300 detects a white line, and automatically turns a steering wheel.

As described above, the single focal length lens system according to the present disclosure is effective as a lens system for the sensing camera, and is also effective as a lens system for a view camera.

As described above, when the in-vehicle camera is applied as a rear view camera (in-vehicle camera for checking a rear view) among view cameras, it is beneficial that the diagonal angle of view is large and that the horizontal angle of view is also large to some extent.

In the case where an image (video) which allows the driver to visually recognize an object, a person, or the like having a height of about 80 cm, for example, is provided at two points F and G closest to the vehicle among the seven points A to G at which it is determined whether visual recognition of the rear view behind the vehicle by the rear view camera is possible or not, in the schematic diagram shown in FIG. 16, it is beneficial that the single focal length lens system included in the in-vehicle camera satisfies the above condition (b), i.e., that the horizontal angle of view is 176° or more. Among the single focal length lens systems according to the present disclosure, the single focal length lens system according to Embodiment 2 has a large horizontal angle of view exceeding 190°. Therefore, each of these single focal length lens systems allows visual recognition of a wider view behind the vehicle, and is very effective as a lens system for the rear view camera.

Embodiment 8 has been described as an example of the technology disclosed in the present application. However, the technology in the present disclosure is not limited thereto, and is also applicable to embodiments in which changes, substitutions, additions, omissions, and/or the like are made as appropriate.

While an example in which the single focal length lens system according to any of Embodiments 1 to 7 of the present disclosure is applied to the in-vehicle camera which is the sensing camera or the view camera has been described as Embodiment 8, the single focal length lens system according to the present disclosure is also applicable to, for example, a monitor camera in a monitor system, a Web camera, and the like.

NUMERICAL EXAMPLES 1 TO 7

The following description is given for numerical examples in which the single focal length lens systems according to Embodiments 1 to 7 are implemented practically. In each numerical example, the units of the length in the tables are all "mm", and the units of the view angle are all "°". In the tables, "view angle" means a diagonal half angle of view. In each numerical example, r is the radius of curvature, d is the axial distance, nd is the refractive index to the d-line, vd is the Abbe number to the d-line, and dn/dt is a relative refractive index temperature coefficient in an atmosphere at 0 to 20° C. with respect to light having a wavelength range of 580 to 640 nm. In each numerical example, the surfaces marked with * are aspheric surfaces, and the aspheric surface configuration is defined by the following expression:

$$Z = \frac{h^2/r}{1+\sqrt{1-(1+\kappa)(h/r)^2}} + \sum A_n h^n$$

where

Z is the distance from a point on an aspherical surface at a height h relative to the optical axis to a tangential plane at the vertex of the aspherical surface, h is the height relative to the optical axis, r is the radius of curvature at the top, κ is the conic constant, and $A_n$ is the n-th order aspherical coefficient.

FIGS. 2, 4, 6, 8, 10, 12 and 14 are longitudinal aberration diagrams, in the infinity in-focus condition, of the single focal length lens systems according to Numerical Examples 1 to 7, respectively.

Each longitudinal aberration diagram, in order from the left side, shows the spherical aberration (SA (mm)), the astigmatism (AST (mm)), and the distortion (DIS (%)).

In each spherical aberration diagram, the vertical axis indicates the F-number (in each Fig., indicated as F), and the solid line, the short dash line, and the long dash line indicate the characteristics to the d-line, the F-line, and the C-line, respectively.

In each astigmatism diagram, the vertical axis indicates the image height, and w indicates the diagonal half angle of view. The solid line and the dash line indicate the characteristics to the sagittal plane (in each Fig., indicated as "s") and the meridional plane (in each Fig., indicated as "m"), respectively.

In each distortion diagram, the vertical axis indicates the image height, and w indicates the diagonal half angle of view. The solid line indicates the distortion when Y=2×f×tan(ω/2) (Y: the image height, f: the focal length of the entire system) is an ideal image height (stereographic projection method).

Numerical Example 1

The single focal length lens system of Numerical Example 1 corresponds to Embodiment 1 shown in FIG. 1. Table 1, Table 2, and Table 3 show the surface data, the aspherical data, and the various data, respectively, of the single focal length lens system of Numerical Example 1.

TABLE 1

(Surface data)

| Surface number | r | d | nd | vd | dn/dt |
|---|---|---|---|---|---|
| Object surface | ∞ | | | | |
| 1 | 117.27020 | 0.80000 | 1.51680 | 64.2 | 2.60E−06 |
| 2 | 8.12200 | 0.83000 | | | |
| 3* | 204.69560 | 0.70000 | 1.53360 | 56.2 | −9.20E−05 |
| 4* | 1.31710 | 1.19190 | | | |
| 5 | 6.27270 | 2.13890 | 1.71736 | 29.5 | 1.10E−06 |
| 6 | −4.76020 | 0.05000 | | | |
| 7 (Diaphragm) | ∞ | 0.10000 | | | |
| 8* | 3.16830 | 0.79640 | 1.63450 | 23.9 | −1.10E−04 |
| 9* | 0.84160 | 2.62670 | 1.53360 | 56.2 | −9.20E−05 |
| 10* | −2.49900 | 2.64150 | | | |
| 11 | ∞ | 0.30000 | 1.51680 | 64.1 | 2.20E−06 |

TABLE 1-continued (Surface data)

| Surface number | r | d | nd | vd | dn/dt |
|---|---|---|---|---|---|
| 12 | ∞ | 0.10000 | | | |
| 13 | ∞ | (BF) | | | |
| Image surface | ∞ | | | | |

TABLE 2

(Aspherical data)

Surface No. 3

K = 1.00000E+03, A4 = −8.26736E−03, A6 = 6.30360E−04, A8 = −2.00380E−05
A10 = 0.00000E+00, A12 = 0.00000E+00
Surface No. 4

K = −6.02742E−01, A4 = −1.11343E−02, A6 = −4.17757E−03, A8 = −4.28238E−04
A10 = 0.00000E+00, A12 = 0.00000E+00
Surface No. 8

K = −4.50671E+00, A4 = −4.38365E−03, A6 = 8.87783E−03, A8 = −6.35719E−03
A10 = 2.30638E−03, A12 = 0.00000E+00
Surface No. 9

K = −7.95705E−01, A4 = −1.17372E−01, A6 = −3.31253E−02, A8 = 6.06183E−02
A10 = −3.32809E−02, A12 = 6.06336E−03
Surface No. 10

K = −4.02485E+00, A4 = −9.61783E−03, A6 = 3.41167E−03, A8 = 3.86418E−04
A10 = −9.72353E−05, A12 = 0.00000E+00

TABLE 3

(Various data)

| | |
|---|---|
| Focal length | 1.9491 |
| F-number | 2.05693 |
| Half view angle | 72.0000 |
| Image height | 2.2114 |
| Overall length of lens | 12.2629 |
| BF | −0.01252 |
| Entrance pupil position | 2.7824 |
| Exit pupil position | −7.3189 |
| Front principal point position | 4.2116 |
| Rear principal point position | 10.3138 |

Single lens data

| Lens | Initial surface No. | Focal length |
|---|---|---|
| 1 | 1 | −16.9277 |
| 2 | 3 | −2.4873 |
| 3 | 5 | 4.1051 |
| 4 | 8 | −2.0829 |
| 5 | 9 | 1.6242 |

Cemented lens data

| Initial surface No. | Final surface No. | Focal length |
|---|---|---|
| 8 | 10 | 3.9826 |

Numerical Example 2

The single focal length lens system of Numerical Example 2 corresponds to Embodiment 2 shown in FIG. 3. Table 4, Table 5, and Table 6 show the surface data, the aspherical data, and the various data, respectively, of the single focal length lens system of Numerical Example 2.

TABLE 4

(Surface data)

| Surface number | r | d | nd | vd | dn/dt |
|---|---|---|---|---|---|
| Object surface | ∞ | | | | |
| 1 | 14.65240 | 0.60000 | 1.77250 | 49.6 | 4.80E−06 |
| 2 | 3.36460 | 2.42380 | | | |
| 3* | −38.50610 | 0.60000 | 1.53360 | 56.2 | −9.20E−05 |
| 4* | 1.30820 | 1.26620 | | | |
| 5* | 7.97110 | 1.40440 | 1.82115 | 24.1 | −2.00E−07 |
| 6* | −5.29880 | 1.61530 | | | |
| 7 (Diaphragm) | ∞ | 0.05630 | | | |
| 8* | 2.25100 | 0.50000 | 1.63450 | 23.9 | −1.10E−04 |
| 9* | 0.99280 | 2.10330 | 1.53360 | 56.2 | −9.20E−05 |
| 10* | −1.83090 | 1.34520 | | | |
| 11 | ∞ | 0.70000 | 1.51680 | 64.1 | 2.20E−06 |
| 12 | ∞ | 0.10000 | | | |
| 13 | ∞ | (BF) | | | |
| Image surface | ∞ | | | | |

TABLE 5

(Aspherical data)

Surface No. 3

K = −1.09248E+02, A4 = −9.57053E−04, A6 = −6.69898E−04, A8 = 1.69320E−04
A10 = −1.63976E−05, A12 = 3.68253E−07, A14 = 0.00000E+00, A16 = 0.00000E+00

TABLE 5-continued (Aspherical data)

Surface No. 4

K = −6.63502E−01, A4 = −2.53233E−02, A6 = −2.51910E−03, A8 = 8.84882E−04
A10 = −3.87419E−04, A12 = 3.49070E−06, A14 = 0.00000E+00, A16 = 0.00000E+00
Surface No. 5

K = 1.74580E+00, A4 = 4.60358E−05, A6 = 8.96602E−05, A8 = −9.23349E−05
A10 = −2.74031E−06, A12 = −3.42497E−06, A14 = 0.00000E+00, A16 = 0.00000E+00
Surface No. 6

K = −2.52590E+00, A4 = 1.57165E−03, A6 = −3.28280E−04, A8 = −1.65913E−04
A10 = −7.25004E−06, A12 = 5.19458E−06, A14 = 0.00000E+00, A16 = 0.00000E+00
Surface No. 8

K = 5.72001E−01, A4 = 1.08381E−02, A6 = −3.16155E−02, A8 = 8.46368E−03
A10 = 1.18491E−02, A12 = −6.31041E−05, A14 = 0.00000E+00, A16 = 0.00000E+00
Surface No. 9

K = −2.08296E−01, A4 = 2.44004E−01, A6 = −8.31894E−01, A8 = 1.68507E+00
A10 = −2.26001E+00, A12 = 1.19147E+00, A14 = 3.44757E−01, A16 = −4.38893E−01
Surface No. 10

K = −1.57275E+00, A4 = 2.38155E−02, A6 = −1.10219E−03, A8 = 4.56091E−03
A10 = −6.24580E−04, A12 = 4.65049E−04, A14 = 0.00000E+00, A16 = 0.00000E+00

TABLE 6

(Various data)

| | |
|---|---|
| Focal length | 0.9012 |
| F-number | 2.07563 |
| Half view angle | 106.0000 |
| Image height | 1.8618 |
| Overall length of lens | 12.7441 |
| BF | 0.02956 |
| Entrance pupil position | 2.9316 |
| Exit pupil position | −5.3622 |
| Front principal point position | 3.6821 |
| Rear principal point position | 11.8429 |

Single lens data

| Lens | Initial surface No. | Focal length |
|---|---|---|
| 1 | 1 | −5.7878 |
| 2 | 3 | −2.3587 |
| 3 | 5 | 4.0704 |
| 4 | 8 | −3.3100 |
| 5 | 9 | 1.6284 |

Cemented lens data

| Initial surface No. | Final surface No. | Focal length |
|---|---|---|
| 8 | 10 | 2.6332 |

Numerical Example 3

The single focal length lens system of Numerical Example 3 corresponds to Embodiment 3 shown in FIG. 5. Table 7, Table 8, and Table 9 show the surface data, the aspherical data, and the various data, respectively, of the single focal length lens system of Numerical Example 3.

TABLE 7

(Surface data)

| Surface number | r | d | nd | vd | dn/dt |
|---|---|---|---|---|---|
| Object surface | ∞ | | | | |
| 1 | ∞ | 1.60000 | 1.51680 | 64.2 | 2.60E−06 |
| 2 | 6.37210 | 0.59000 | | | |
| 3* | 22.47150 | 0.50000 | 1.53360 | 56.2 | −9.20E−05 |
| 4* | 1.32470 | 1.21000 | | | |
| 5 | 7.67280 | 1.76000 | 1.84666 | 23.8 | 5.00E−07 |
| 6 | −5.27250 | 0.05000 | | | |
| 7(Diaphragm) | ∞ | 0.10000 | | | |
| 8* | 3.08980 | 0.70000 | 1.63450 | 23.9 | −1.10E−04 |
| 9* | 0.82060 | 2.97000 | 1.53360 | 56.2 | −9.20E−05 |
| 10* | −2.28990 | 2.41530 | | | |
| 11 | ∞ | 0.30000 | 1.51680 | 64.1 | 2.20E−06 |
| 12 | ∞ | 0.10000 | | | |
| 13 | ∞ | (BF) | | | |
| Image surface | ∞ | | | | |

TABLE 8

(Aspherical data)

Surface No. 3

K = −3.04111E+02, A4 = −1.23183E−02, A6 = 2.21500E−04,
A8 = 8.33625E−05 A10 = 2.36602E−05, A12 = −3.48640E−06
Surface No. 4

K = −6.07940E−01, A4 = −1.63001E−02, A6 = −1.06779E−02,
A8 = 3.45789E−04 A10 = 8.85768E−04, A12 = −1.87582E−04
Surface No. 8

K = −4.12479E+00, A4 = −2.72077E−03, A6 = 9.08087E−03,
A8 = −7.63530E−03 A10 = 2.37777E−03, A12 = 2.94662E−04
Surface No. 9

K = −8.28360E−01, A4 = −1.05662E−01, A6 = 3.02353E−02,
A8 = −3.19613E−02 A10 = 2.51526E−02, A12 = −7.33380E−03
Surface No. 10

K = −3.64838E+00, A4 = −1.19424E−02, A6 = 3.94125E−03,
A8 = 7.29866E−04 A10 = −5.04016E−04, A12 = 7.41959E−05

TABLE 9

(Various data)

| | |
|---|---|
| Focal length | 1.9375 |
| F-number | 2.05365 |
| Half view angle | 72.0000 |
| Image height | 2.2042 |
| Overall length of lens | 12.2920 |
| BF | −0.00326 |
| Entrance pupil position | 2.9058 |
| Exit pupil position | −8.3394 |
| Front principal point position | 4.3930 |
| Rear principal point position | 10.3545 |

Single lens data

| Lens | Initial surface No. | Focal length |
|---|---|---|
| 1 | 1 | −12.3300 |
| 2 | 3 | −2.6600 |
| 3 | 5 | 3.9364 |
| 4 | 8 | −2.0006 |
| 5 | 9 | 1.6954 |

Cemented lens data

| Initial surface No. | Final surface No. | Focal length |
|---|---|---|
| 8 | 10 | 3.7925 |

Numerical Example 4

The single focal length lens system of Numerical Example 4 corresponds to Embodiment 4 shown in FIG. 7. Table 10, Table 11, and Table 12 show the surface data, the aspherical data, and the various data, respectively, of the single focal length lens system of Numerical Example 4.

TABLE 10

(Surface data)

| Surface number | r | d | nd | vd | dn/dt |
|---|---|---|---|---|---|
| Object surface | ∞ | | | | |
| 1 | ∞ | 0.60000 | 1.51680 | 64.2 | 2.60E−06 |
| 2 | 3.69120 | 0.83000 | | | |
| 3* | 3.52170 | 0.70000 | 1.53360 | 56.2 | −9.20E−05 |
| 4* | 1.33950 | 1.70890 | | | |
| 5 | 33.86420 | 1.52690 | 2.14780 | 17.3 | 2.67E−05 |
| 6 | −8.22460 | 0.05000 | | | |
| 7 (Diaphragm) | ∞ | 0.10000 | | | |
| 8* | 3.24620 | 0.70000 | 1.63450 | 23.9 | −1.10E−04 |
| 9* | 0.81360 | 2.46700 | 1.53360 | 56.2 | −9.20E−05 |
| 10* | −2.29710 | 3.16100 | | | |
| 11 | ∞ | 0.30000 | 1.51680 | 64.1 | 2.20E−06 |
| 12 | ∞ | 0.10000 | | | |
| 13 | ∞ | (BF) | | | |
| Image surface | ∞ | | | | |

TABLE 11

(Aspherical data)

Surface No. 3

K = −1.14487E+00, A4 = −8.67240E−03, A6 = −8.49187E−04, A8 = 7.91269E−05 A10 = 0.00000E+00, A12 = 0.00000E+00

Surface No. 4

K = −6.29566E−01, A4 = −7.68335E−03, A6 = −2.76426E−03, A8 = −1.23578E−03 A10 = 0.00000E+00, A12 = 0.00000E+00

TABLE 11-continued (Aspherical data)

Surface No. 8

K = −4.59735E+00, A4 = −6.00827E−03, A6 = 7.30991E−03, A8 = −6.11575E−03 A10 = 2.07527E−03, A12 = 0.00000E+00

Surface No. 9

K = −8.14371E−01, A4 = −1.00995E−01, A6 = −4.57734E−02, A8 = 5.14734E−02 A10 = −2.69037E−02, A12 = 5.08193E−03

Surface No. 10

K = −3.36131E+00, A4 = −1.50857E−02, A6 = 1.89832E−03, A8 = 4.32143E−04 A10 = 1.22880E−05, A12 = −4.31757E−06

TABLE 12

(Various data)

| | |
|---|---|
| Focal length | 1.9634 |
| F-number | 2.04172 |
| Half view angle | 72.0000 |
| Image height | 2.2352 |
| Overall length of lens | 12.2223 |
| BF | −0.02150 |
| Entrance pupil position | 2.5727 |
| Exit pupil position | −7.5825 |
| Front principal point position | 4.0263 |
| Rear principal point position | 10.2589 |

Single lens data

| Lens | Initial surface No. | Focal length |
|---|---|---|
| 1 | 1 | −7.1424 |
| 2 | 3 | −4.5602 |
| 3 | 5 | 5.8793 |
| 4 | 8 | −1.9263 |
| 5 | 9 | 1.5550 |

Cemented lens data

| Initial surface No. | Final surface No. | Focal length |
|---|---|---|
| 8 | 10 | 3.7865 |

Numerical Example 5

The single focal length lens system of Numerical Example 5 corresponds to Embodiment 5 shown in FIG. 9. Table 13, Table 14, and Table 15 show the surface data, the aspherical data, and the various data, respectively, of the single focal length lens system of Numerical Example 5.

TABLE 13

(Surface data)

| Surface number | r | d | nd | vd | dn/dt |
|---|---|---|---|---|---|
| Object surface | ∞ | | | | |
| 1 | ∞ | 0.60000 | 1.53360 | 56.2 | −9.20E−05 |
| 2 | 3.05580 | 0.83000 | | | |
| 3* | 3.79930 | 0.70000 | 1.53360 | 56.2 | −9.20E−05 |
| 4* | 1.38380 | 1.36410 | | | |
| 5 | 12.81230 | 1.99990 | 1.92286 | 20.9 | 8.00E−07 |
| 6 | −6.67510 | 0.05000 | | | |
| 7 (Diaphragm) | ∞ | 0.10000 | | | |
| 8* | 3.19770 | 0.70000 | 1.63450 | 23.9 | −1.10E−04 |
| 9* | 0.83380 | 2.43560 | 1.53360 | 56.2 | −9.20E−05 |
| 10* | −2.56710 | 3.12860 | | | |
| 11 | ∞ | 0.30000 | 1.51680 | 64.1 | 2.20E−06 |
| 12 | ∞ | 0.10000 | | | |
| 13 | ∞ | (BF) | | | |
| Image surface | ∞ | | | | |

TABLE 14

(Aspherical data)

Surface No. 3

K = −2.87340E+00, A4 = −1.03518E−02, A6 = −9.45778E−07,
A8 = 0.00000E+00 A10 = 0.00000E+00, A12 = 0.00000E+00
Surface No. 4

K = −6.19061E−01, A4 = −1.62111E−02, A6 = −1.68129E−03,
A8 = 0.00000E+00 A10 = 0.00000E+00, A12 = 0.00000E+00
Surface No. 8

K = −4.34843E+00, A4 = −3.85851E−03, A6 = 9.10721E−03,
A8 = −6.69302E−03 A10 = 1.93123E−03, A12 = 0.00000E+00
Surface No. 9

K = −7.90837E−01, A4 = −1.01176E−01, A6 = −3.87581E−02,
A8 = 5.24043E−02 A10 = −2.98829E−02, A12 = 5.75267E−03
Surface No. 10

K = −4.14903E+00, A4 = −1.26985E−02, A6 = 2.39974E−03,
A8 = 5.48453E−04 A10 = −3.77940E−05, A12 = 0.00000E+00

TABLE 15

(Various data)

| | |
|---|---|
| Focal length | 1.9760 |
| F-number | 2.04316 |
| Half view angle | 72.0000 |
| Image height | 2.2309 |
| Overall length of lens | 12.2911 |
| BF | −0.01714 |
| Entrance pupil position | 2.4174 |
| Exit pupil position | −7.1108 |
| Front principal point position | 3.8429 |
| Rear principal point position | 10.3151 |

Single lens data

| Lens | Initial surface No. | Focal length |
|---|---|---|
| 1 | 1 | −5.7268 |
| 2 | 3 | −4.5364 |
| 3 | 5 | 5.0019 |
| 4 | 8 | −2.0085 |
| 5 | 9 | 1.5709 |

Cemented lens data

| Initial surface No. | Final surface No. | Focal length |
|---|---|---|
| 8 | 10 | 4.0170 |

Numerical Example 6

The single focal length lens system of Numerical Example 6 corresponds to Embodiment 6 shown in FIG. 11. Table 16, Table 17, and Table 18 show the surface data, the aspherical data, and the various data, respectively, of the single focal length lens system of Numerical Example 6.

TABLE 16

(Surface data)

| Surface number | r | d | nd | vd | dn/dt |
|---|---|---|---|---|---|
| Object surface | ∞ | | | | |
| 1* | −104.40470 | 0.78530 | 1.53360 | 56.2 | −9.20E−05 |
| 2* | 1.28850 | 1.26010 | | | |
| 3 | 9.80780 | 2.43400 | 1.84666 | 23.8 | 5.00E−07 |
| 4 | −5.68280 | 0.05000 | | | |
| 5 (Diaphragm) | ∞ | 0.10000 | | | |

TABLE 16-continued (Surface data)

| Surface number | r | d | nd | vd | dn/dt |
|---|---|---|---|---|---|
| 6* | 3.08610 | 0.70350 | 1.63450 | 23.9 | −1.10E−04 |
| 7* | 0.85010 | 2.96250 | 1.53360 | 56.2 | −9.20E−05 |
| 8* | −2.45970 | 2.59800 | | | |
| 9 | ∞ | 0.30000 | 1.51680 | 64.1 | 2.20E−06 |
| 10 | ∞ | 0.10000 | | | |
| 11 | ∞ | (BF) | | | |
| Image surface | ∞ | | | | |

TABLE 17

(Aspherical data)

Surface No. 1

K = 7.93198E+02, A4 = −6.88724E−03, A6 = 7.02815E−04,
A8 = −2.09750E−05 A10 = 0.00000E+00, A12 = 0.00000E+00
Surface No. 2

K = −6.22825E−01, A4 = −8.16408E−03, A6 = −7.77818E−03,
A8 = 1.15007E−03 A10 = 0.00000E+00, A12 = 0.00000E+00
Surface No. 6

K = −4.44965E+00, A4 = −4.49863E−03, A6 = 8.75524E−03,
A8 = −5.85040E−03 A10 = 2.06144E−03, A12 = 0.00000E+00
Surface No. 7

K = −8.42346E−01, A4 = −1.11613E−01, A6 = −3.49974E−02,
A8 = 6.32611E−02 A10 = −3.54244E−02, A12 = 7.17991E−03
Surface No. 8

K = −4.10766E+00, A4 = −9.65269E−03, A6 = 3.41264E−03,
A8 = 4.78463E−04 A10 = −1.01991E−04, A12 = 0.00000E+00

TABLE 18

(Various data)

| | |
|---|---|
| Focal length | 2.0630 |
| F-number | 2.05097 |
| Half view angle | 58.5000 |
| Image height | 2.2118 |
| Overall length of lens | 11.2676 |
| BF | −0.02577 |
| Entrance pupil position | 1.7946 |
| Exit pupil position | −8.0465 |
| Front principal point position | 3.3269 |
| Rear principal point position | 9.2046 |

Single lens data

| Lens | Initial surface No. | Focal length |
|---|---|---|
| 1 | 1 | −2.3791 |
| 2 | 3 | 4.5796 |
| 3 | 6 | −2.1064 |
| 4 | 7 | 1.7194 |

Cemented lens data

| Initial surface No. | Final surface No. | Focal length |
|---|---|---|
| 6 | 8 | 3.9319 |

Numerical Example 7

The single focal length lens system of Numerical Example 7 corresponds to Embodiment 7 shown in FIG. 13. Table 19, Table 20, and Table 21 show the surface data, the aspherical data, and the various data, respectively, of the single focal length lens system of Numerical Example 7.

TABLE 19

(Surface data)

| Surface number | r | d | nd | vd | dn/dt |
|---|---|---|---|---|---|
| Object surface | ∞ | | | | |
| 1 | ∞ | 0.60000 | 1.53360 | 56.2 | −9.20E−05 |
| 2 | 2.58500 | 1.93230 | | | |
| 3 | −2.72880 | 2.00000 | 1.84666 | 23.8 | 5.00E−07 |
| 4 | −3.29640 | 0.21480 | | | |
| 5 (Diaphragm) | ∞ | 0.39500 | | | |
| 6* | 2.40460 | 3.34080 | 1.53360 | 56.2 | −9.20E−05 |
| 7* | −0.78660 | 1.08430 | 1.63450 | 23.9 | −1.10E−04 |
| 8* | −2.58400 | 2.11870 | | | |
| 9 | ∞ | 0.30000 | 1.51680 | 64.1 | 2.20E−06 |
| 10 | ∞ | 0.10000 | | | |
| 11 | ∞ | (BF) | | | |
| Image surface | ∞ | | | | |

TABLE 20

(Aspherical data)

Surface No. 6

K = −4.23314E−01, A4 = 1.34859E−03, A6 = −5.06936E−03,
A8 = 1.69123E−03 A10 = 1.70678E−03, A12 = −1.49720E−04,
A14 = −6.88557E−04, A16 = 1.90050E−04

Surface No. 7

K = −9.29601E−01, A4 = 8.95725E−02, A6 = −5.39842E−02,
A8 = 8.31992E−02 A10 = −5.31253E−02, A12 = 1.02294E−02,
A14 = −4.36706E−04, A16 = 2.87665E−04

Surface No. 8

K = −1.45933E+00, A4 = 2.38184E−02, A6 = −1.18161E−03,
A8 = 2.11442E−03 A10 = −8.08591E−04, A12 = 8.70251E−05,
A14 = 9.13405E−06, A16 = 1.82200E−08

TABLE 21

(Various data)

| | |
|---|---|
| Focal length | 2.0040 |
| F-number | 2.06849 |
| Half view angle | 75.0000 |
| Image height | 2.2607 |
| Overall length of lens | 12.0796 |
| BF | −0.00626 |
| Entrance pupil position | 2.1911 |
| Exit pupil position | −9.7585 |
| Front principal point position | 3.7833 |
| Rear principal point position | 10.0756 |

Single lens data

| Lens | Initial surface No. | Focal length |
|---|---|---|
| 1 | 1 | −4.8445 |
| 2 | 3 | 30.4103 |
| 3 | 6 | 1.7472 |
| 4 | 7 | −2.3273 |

Cemented lens data

| Initial surface No. | Final surface No. | Focal length |
|---|---|---|
| 6 | 8 | 3.8889 |

The following Tables 22 and 23 show the corresponding values to the individual conditions in the single focal length lens systems according to the respective Numerical Examples.

TABLE 22

(Values corresponding to conditions)

| Conditions | | Numerical Examples | | | |
|---|---|---|---|---|---|
| | | 1 | 2 | 3 | 4 |
| (1-1) | $|dn/dt|_{MAX}$ | 1.10E−06 | 2.00E−07 | 5.00E−07 | 2.67E−05 |
| (2) | $2\omega_{DIA}$ | 144 | 212 | 144 | 144 |
| (3) | $f_{G2}/f$ | 2.0433 | 2.9220 | 1.9574 | 1.9286 |
| (4) | $f_{LN}/f$ | −1.2761 | −2.6174 | −1.3729 | −2.3226 |
| (5) | $vd_{LP}$ | 29.5 | 24.1 | 23.8 | 17.3 |
| (1-2) | $|dn/dt|_{L2}$ | 1.10E−06 | 2.00E−07 | 5.00E−07 | 2.67E−05 |
| (a) | $|dBF/f|$ | 1.25E−04 | 3.19E−04 | 1.18E−04 | 2.27E−04 |
| (b) | $2\omega_{HOR}$ | 104 | 193 | 104 | 104 |
| | f | 1.9491 | 0.9012 | 1.9375 | 1.9634 |
| | $f_{G2}$ | 3.9826 | 2.6332 | 3.7925 | 3.7865 |
| | $f_{LN}$ | −2.4873 | −2.3587 | −2.6600 | −4.5602 |
| | dBF | 2.44E−04 | 2.88E−04 | 2.28E−04 | 4.46E−04 |

TABLE 23

(Values corresponding to conditions)

| Conditions | | Numerical Examples | | |
|---|---|---|---|---|
| | | 5 | 6 | 7 |
| (1-1) | $|dn/dt|_{MAX}$ | 8.00E−07 | 5.00E−07 | 5.00E−07 |
| (2) | $2\omega_{DIA}$ | 144 | 117 | 150 |
| (3) | $f_{G2}/f$ | 2.0329 | 1.9059 | 1.9406 |
| (4) | $f_{LN}/f$ | −2.2958 | −1.1532 | −2.4173 |
| (5) | $vd_{LP}$ | 20.9 | 23.8 | 23.8 |
| (1-2) | $|dn/dt|_{L2}$ | 8.00E−07 | 5.00E−07 | 5.00E−07 |
| (a) | $|dBF/f|$ | 1.69E−04 | 1.18E−04 | 2.85E−04 |
| (b) | $2\omega_{HOR}$ | 104 | 91 | 104 |
| | f | 1.9760 | 2.0630 | 2.0040 |
| | $f_{G2}$ | 4.0170 | 3.9319 | 3.8889 |
| | $f_{LN}$ | −4.5364 | −2.3791 | −4.8445 |
| | dBF | 3.34E−04 | 2.43E−04 | 5.72E−04 |

The present disclosure is applicable to an in-vehicle camera, a monitor camera, a Web camera, and the like. In particular, the present disclosure is beneficial in a camera which is required to have a wide-angle lens system, such as an in-vehicle camera and a monitor camera.

As presented above, the embodiments have been described as examples of the technology according to the present disclosure. For this purpose, the accompanying drawings and the detailed description are provided.

Therefore, components in the accompanying drawings and the detailed description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. A single focal length lens system, in order from an object side to an image side, comprising a first lens unit having optical power, an aperture diaphragm, and a second lens unit having positive optical power, wherein the first lens unit, in order from the object side to the image side, includes a first sub-lens unit having negative optical power, and a second sub-lens unit having positive optical power, the first sub-lens unit includes at least one lens element, a lens element included in the first sub-lens unit and having a greatest negative optical power is a lens element made of resin, and has a concave surface facing the image side, the second lens unit comprises a cemented lens element, the cemented lens element is obtained by cementing two lens elements made of resin, and comprises a lens element having negative optical power and a lens element having positive optical power, and has a joint surface which is an aspheric surface, and the following conditions (1-1), (3) and (4) are satisfied:

$$|dn/dt|_{MAX} \leq 2.67 \times 10^{-5} \tag{1-1}$$

$$1.5 \leq f_{G2}/f \leq 3.5 \tag{3}$$

$$-3.5 \leq f_{LN}/f \leq -0.5 \tag{4}$$

where $|dn/dt|_{MAX}$ is a maximum value of absolute values of relative refractive index temperature coefficients in an atmosphere at 0 to 20° C. with respect to light having a wavelength range of 580 to 640 nm, which is calculated for each lens element constituting the second sub-lens unit, $f_{G2}$ is a focal length at d-line of the second lens unit, f is the focal length at d-line of the entire system, and $f_{LN}$ is a focal length at d-line of the lens element included in the first sub-lens unit and having the greatest negative optical power.

2. The single focal length lens system as claimed in claim 1 satisfying the following condition (2):

$$2\omega_{DIA} \geq 90 \tag{2}$$

where $2\omega_{DIA}$ is a diagonal angle of view (°).

3. The single focal length lens system as claimed in claim 1, wherein the first lens unit includes a lens element made of glass at a position closest to the object side.

4. The single focal length lens system as claimed in claim 1, wherein the second sub-lens unit comprises a single lens element having positive optical power, and the following condition (5) is satisfied:

$$vd_{LP} < 35 \tag{5}$$

where $vd_{LP}$ is an Abbe number at d-line of the lens element included in the second sub-lens unit and having positive optical power.

5. A camera comprising:

the single focal length lens system as claimed in claim 1; and an imaging device which captures an image of light converged by the single focal length lens system.

6. An automobile comprising:

the camera as claimed in claim 5; and a processing unit which detects external environment on the basis of the image captured by the imaging device included in the camera, and controls each part.

7. A single focal length lens system comprising an aperture diaphragm, a first lens unit disposed on an object side relative to the aperture diaphragm, and a second lens unit disposed on an image side relative to the aperture diaphragm, wherein the first lens unit includes a first lens element which is made of resin and has negative optical power, and a second lens element which is disposed on the image side relative to the first lens element, is made of glass, and has positive optical power, the second lens unit includes a cemented lens element which is obtained by cementing at least two lens elements made of resin, and has positive optical power, and the second lens element satisfies the following condition (1-2):

$$|dn/dt|_{L2} \leq 2.67 \times 10^{-5} \tag{1-2}$$

where $|dn/dt|_{L2}$ is an absolute value of a relative refractive index temperature coefficient in an atmosphere at 0 to 20° C. with respect to light having a wavelength range of 580 to 640 nm, which is calculated for the second lens element.

* * * * *